US008717589B2

(12) United States Patent
Okada et al.

(10) Patent No.: US 8,717,589 B2
(45) Date of Patent: May 6, 2014

(54) IMAGE PROCESSING SYSTEM, JOB EXECUTION METHOD, AND NON-TRANSITORY COMPUTER-READABLE RECORDING MEDIUM ENCODED WITH JOB EXECUTION PROGRAM

(75) Inventors: Takuya Okada, Toyokawa (JP);
Tomoko Maruyama, Toyokawa (JP);
Kenichi Komaba, Toyokawa (JP);
Toshimi Shinchi, Toyokawa (JP); Koichi Amiya, Anjo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 186 days.

(21) Appl. No.: 13/451,639

(22) Filed: Apr. 20, 2012

(65) Prior Publication Data
US 2012/0268785 A1    Oct. 25, 2012

(30) Foreign Application Priority Data
Apr. 22, 2011    (JP) .................................. 2011-096569

(51) Int. Cl.
*G06F 3/12*      (2006.01)
*G06F 9/46*      (2006.01)

(52) U.S. Cl.
USPC ....... 358/1.13; 358/1.15; 358/1.16; 358/1.17; 705/301; 718/100; 718/101; 718/102; 718/106

(58) Field of Classification Search
USPC .................... 358/1.11–1.18; 718/1, 100–108; 705/7.27, 301, 348; 382/100; 710/7–11, 15–19
See application file for complete search history.

(56) References Cited

U.S. PATENT DOCUMENTS 7,502,129 B2 *  3/2009  Tohyama ..................... 358/1.13
7,769,312 B2    8/2010  Higashi
(Continued)

FOREIGN PATENT DOCUMENTS

JP    2004-171237 A    6/2004
JP    2005-057600 A    3/2005
(Continued)

OTHER PUBLICATIONS

Office Action (Decision to Grant Patent) issued on Jul. 2, 2013, by the Japanese Patent Office in corresponding Japanese Patent Application No. 2011-096569, and an English Translation of the Office Action. (6 pages).

*Primary Examiner* — Chad Dickerson
(74) *Attorney, Agent, or Firm* — Buchanan Ingersoll & Rooney PC

(57) ABSTRACT

Each of a plurality of process execution portions includes an accumulation portion to accumulate a job in which the first process among processes not yet executed is an in-charge process, and a batch processing portion to execute the in-charge process on combination data including one or more data on condition that a total process volume becomes equal to or greater than a lower limit value predetermined for the in-charge process. The batch processing portion includes a determination portion to determine whether there exists a job having a previous process now being executed, a first delay portion to delay start of the in-charge process until a prescribed time has elapsed since the total process volume becomes equal to or greater than the lower limit value, and a second delay portion to delay start of the in-charge process until a job determined that the previous process is now being executed is accumulated.

11 Claims, 12 Drawing Sheets

(56) References Cited

U.S. PATENT DOCUMENTS

| | | |
|---|---|---|
| 2003/0110201 A1* | 6/2003 | Tanaka .................. 709/102 |
| 2005/0030579 A1 | 2/2005 | Tohyama |
| 2009/0033977 A1* | 2/2009 | Morales et al. ............. 358/1.15 |
| 2010/0214602 A1 | 8/2010 | Moriwaki |
| 2011/0128584 A1* | 6/2011 | Kuroshima ................ 358/1.15 |

FOREIGN PATENT DOCUMENTS

| | | |
|---|---|---|
| JP | 2008-103837 A | 5/2008 |
| JP | 2010-199838 A | 9/2010 |

* cited by examiner

F I G. 2
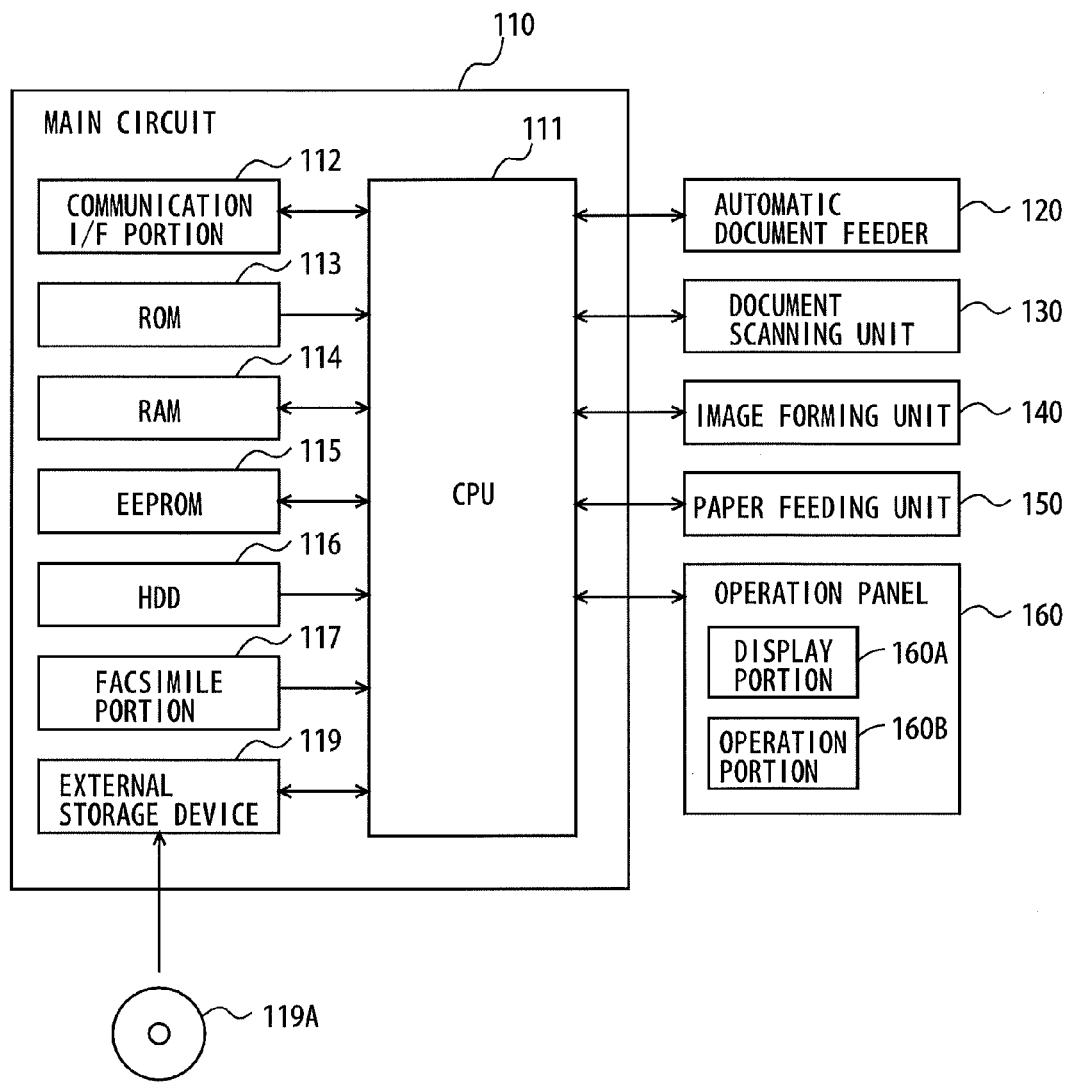

F I G. 4

| PROCESS IDENTIFICATION INFORMATION | APPARATUS IDENTIFICATION INFORMATION | CONTENT | BILLING INFORMATION | | |
|---|---|---|---|---|---|
| | | | BEFORE DISCOUNT | AFTER DISCOUNT | DISCOUNT TERMS |
| SCAN | FIRST MFP | SCAN DOCUMENT | — | — | — |
| IMAGE FORMING | FIRST MFP | PRINT | — | — | — |
| DATA TRANSMISSION | FIRST MFP | SEND EMAIL OF DATA | — | — | — |
| FAX TRANSMISSION | FIRST MFP | SEND FACSIMILE | — | — | — |
| CHARACTER RECOGNITION | FIRST MFP | OPTICALLY SCAN CHARACTERS | 10 YEN /CHARACTER | 5 YEN/ CHARACTER | 10000 CHARACTERS OR MORE |
| TRANSLATION | SECOND MFP | CONVERT JAPANESE TEXT INTO ENGLISH TEXT | 20 YEN/ CHARACTER | 10 YEN/ CHARACTER | 10000 CHARACTERS OR MORE |
| COLOR CONVERSION | THIRD MFP | CONVERT COLOR OF IMAGES | 50 YEN/ PAGE | 30 YEN/ PAGE | 100 PAGES OR MORE |
| EDGE ENHANCEMENT | FOURTH MFP | CONVERT INTO SHARP EDGES OF IMAGES | 20 YEN/ PAGE | 10 YEN/ PAGE | 100 PAGES OR MORE |
| FORMAT CONVERSION | FIFTH MFP | CONVERT INTO PDF FORMAT | 10 YEN /PAGE | 5 YEN/ PAGE | 100 PAGES OR MORE |

F I G. 5
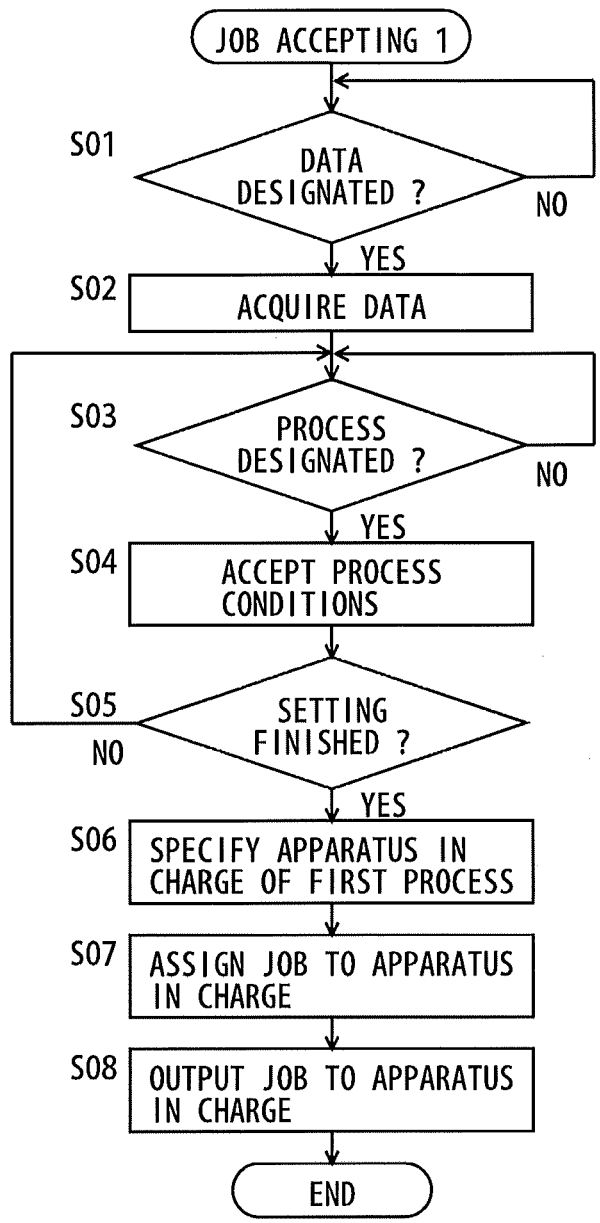

FIG. 8

| JOB IDENTIFICATION INFORMATION | FIRST | SECOND | THIRD | FOURTH |
|---|---|---|---|---|
| JOB01 | EDGE ENHANCEMENT | CHARACTER RECOGNITION | FORMAT CONVERSION | DATA TRANSMISSION |
| JOB02 | EDGE ENHANCEMENT | CHARACTER RECOGNITION | FORMAT CONVERSION | IMAGE FORMING |
| JOB03 | CHARACTER RECOGNITION | FORMAT CONVERSION | IMAGE FORMING | |
| JOB04 | CHARACTER RECOGNITION | FORMAT CONVERSION | IMAGE FORMING | |
| JOB05 | CHARACTER RECOGNITION | FORMAT CONVERSION | FAX TRANSMISSION | |

FIG. 9

| JOB IDENTIFICATION INFORMATION | FIRST | SECOND | THIRD | FOURTH |
|---|---|---|---|---|
| JOB01 | EDGE ENHANCEMENT | CHARACTER RECOGNITION | FORMAT CONVERSION | DATA TRANSMISSION |
| JOB02 | EDGE ENHANCEMENT | CHARACTER RECOGNITION | FORMAT CONVERSION | IMAGE FORMING |
| JOB03 | CHARACTER RECOGNITION | FORMAT CONVERSION | IMAGE FORMING | |
| JOB04 | CHARACTER RECOGNITION | FORMAT CONVERSION | IMAGE FORMING | |
| JOB05 | CHARACTER RECOGNITION | FORMAT CONVERSION | FAX TRANSMISSION | |

F I G. 10
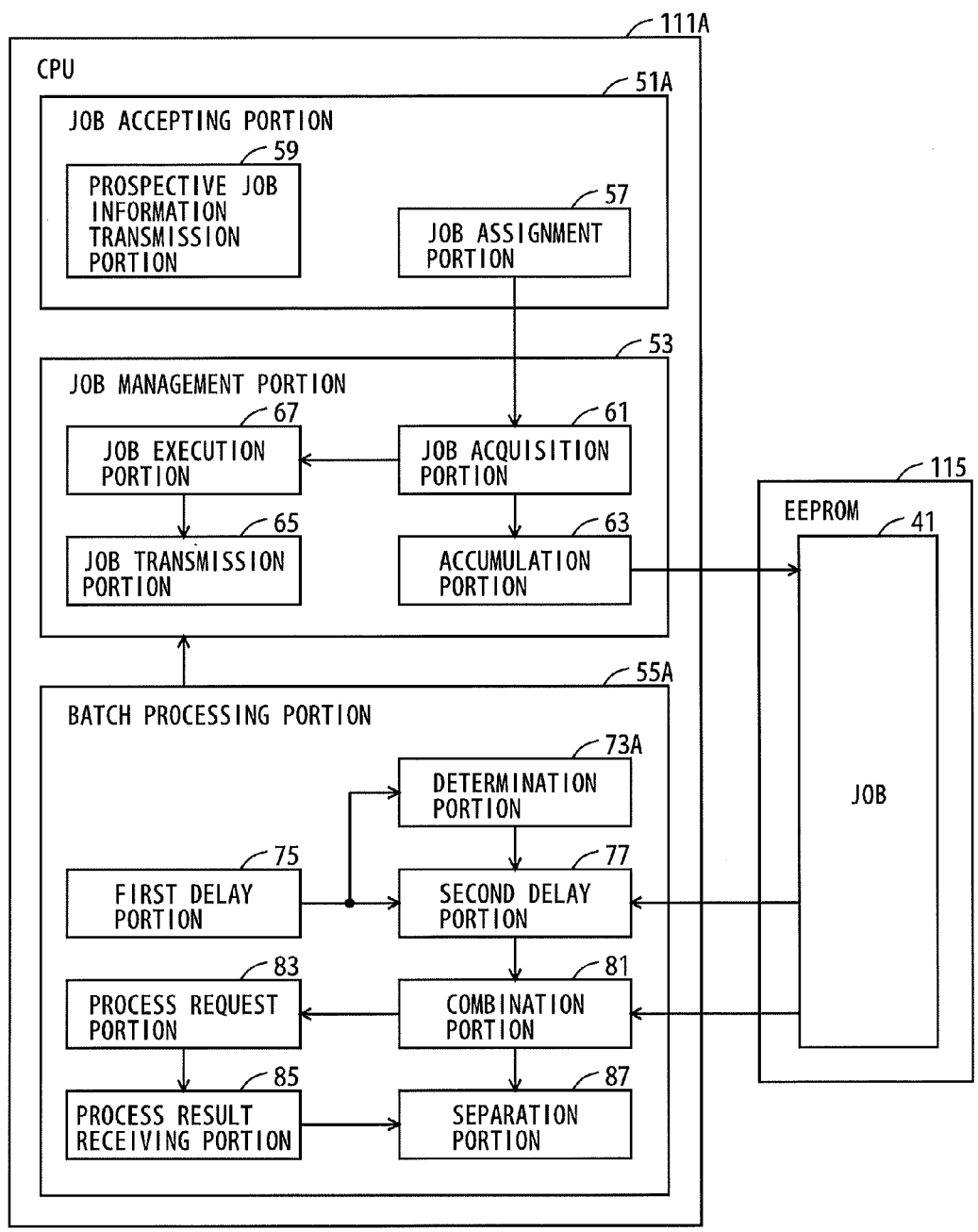

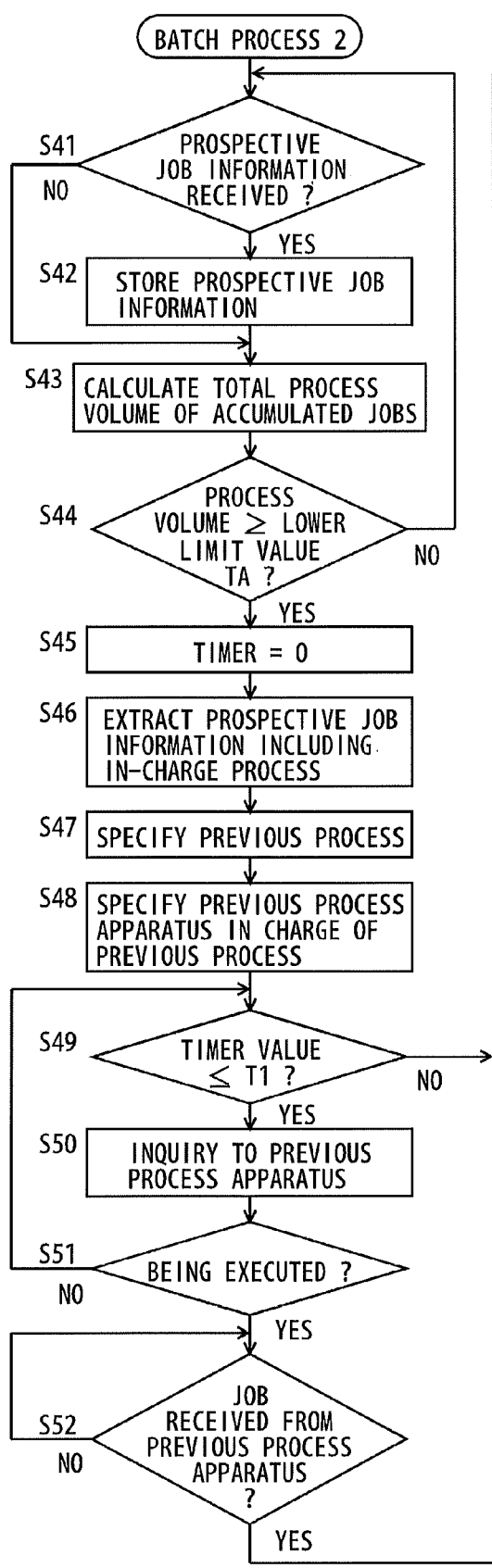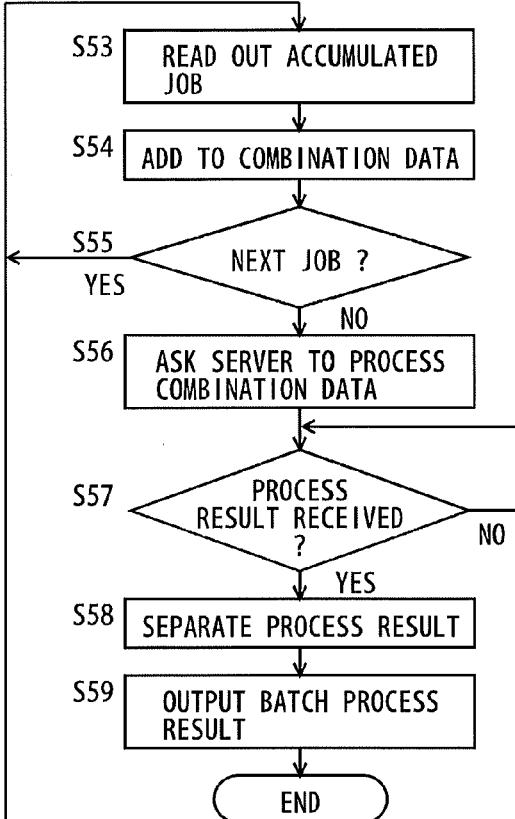
FIG. 13

IMAGE PROCESSING SYSTEM, JOB EXECUTION METHOD, AND NON-TRANSITORY COMPUTER-READABLE RECORDING MEDIUM ENCODED WITH JOB EXECUTION PROGRAM

This application is based on Japanese Patent Application No. 2011-096569 filed with Japan Patent Office on Apr. 22, 2011, the entire content of which is hereby incorporated by reference.

BACKGROUND OF THE INVENTION

1. Field of the Invention

The present invention relates to an image processing system, a job execution method, and a job execution program, and more particularly to an image processing system having a function of executing a process collectively on a plurality of jobs, a job execution method, and a job execution program.

2. Description of the Related Art

In recent years, services provided by an external server, for example, SaaS (Software as a Service) can be used to perform processes that cannot be performed by a Multi-Function Peripheral (hereinafter referred to as "MFP"). On the other hand, execution of some processes by SaaS involves cost. There are a variety of billing methods, generally including a method of charging a fixed rate up to a certain usage amount and thereafter charging an additional fee per use, and a discount billing method of billing a discount rate when a large volume of processing is requested and the utilization rate is thus increased. Therefore, when using SaaS, the cost can be reduced by accumulating data up to a certain usage amount and requesting SaaS to execute processing on a plurality of accumulated data collectively rather than solely for each of plural pieces of data.

Japanese Patent Laid-Open No. 2008-103837 discloses a technique of executing a job at a timing when cost is low. Japanese Laid-Open Patent Publication No. 2008-103837 describes an image forming apparatus in which the total image output cost of all the image output jobs at any given time is calculated based on the processing time for all the target image output jobs stored in image information storing means and unit cost information calculated by cost information management means, and the time at which the total image output cost is cheapest is set as a print execution timing for each image output job.

However, in the conventional image forming apparatus, an image output job generated after the print execution timing is not executed until the subsequently set print execution timing. Therefore, although the cost can be reduced, the wait time is increased. In the case of using SaaS, if a process is executed using SaaS immediately after a certain usage amount is reached, data generated immediately afterward is not executed until a certain usage amount is reached next time, resulting in a longer wait time.

SUMMARY OF THE INVENTION

According to an aspect of the present invention, an image processing system includes: a plurality of process execution portions, each being capable of executing an in-charge process selected from a plurality of processes; and a job accepting portion to accept a job which defines data serving as a process target, one or more processes selected from the plurality of processes for the data, and an order of executing the one or more processes. Each of the plurality of process execution portions includes an accumulation portion to accumulate a job that is accepted by the job accepting portion and in which a process in the first place in the order among processes not yet executed is the in-charge process, and a batch processing portion to, on condition that a total process volume for executing one or more jobs accumulated by the accumulation portion becomes equal to or greater than a lower limit value predetermined for the in-charge process, execute the in-charge process on combination data in which one or more data that are process targets of the accumulated one or more jobs are combined into one. The batch processing portion includes a determination portion to determine whether there exists a job that includes the in-charge process and in which a previous process immediately before the in-charge process is now being executed, among a plurality of jobs accepted by the job accepting portion, a first delay portion to delay start of the in-charge process until a prescribed time has elapsed since a start-enabled time at which the total process volume becomes equal to or greater than the lower limit value, and a second delay portion to delay start of the in-charge process until a job determined that the previous process is now being executed is accumulated in the accumulation portion, if it is determined by the determination portion that there exists a job in which the previous process is now being executed, before the prescribed time has elapsed since the start-enabled time.

According to another aspect of the present invention, a job execution method is executed in an image processing system including a plurality of process execution portions each being capable of executing an in-charge process selected from a plurality of processes. The method allows each of the plurality of process execution portions to execute: an accumulation step of accumulating a job which defines data serving as a process target, one or more processes selected from the plurality of processes for the data, and an order of executing the one or more processes, and in which a process in the first place in the order among processes not yet executed is the in-charge process; and a batch processing step of, on condition that a total process volume for executing one or more jobs accumulated in the accumulation step becomes equal to or greater than a lower limit value predetermined for the in-charge process, executing the in-charge process on combination data in which one or more data that are process targets of the accumulated one or more jobs are combined into one. The batch processing step includes a determination step of determining whether there exists a job that is not accumulated in the accumulation step and in which a previous process immediately before the in-charge process is now being executed, a first delay step of delaying start of the in-charge process until a prescribed time has elapsed since a start-enabled time at which the total process volume becomes equal to or greater than the lower limit value, and a second delay step of delaying start of the in-charge process until a job determined that the previous process is now being executed is accumulated in the accumulation step, if it is determined in the determination step that there exists a job in which the previous process is now being executed, before the prescribed time has elapsed since the start-enabled time.

In accordance with a further aspect of the present invention, a non-transitory computer-readable recording medium is encoded with a job execution program performed by a computer. The program is executed in an image processing system including a plurality of process execution apparatuses, each being capable of executing an in-charge process selected from a plurality of processes. The program causes the computer controlling each of the plurality of process execution apparatuses to execute: an accumulation step of accumulating a job which defines data serving as a process target, one or more processes selected from the plurality of processes for the data, and an order of executing the one or more processes, and in which a process in the first place in the order among processes not yet executed is the in-charge process; and a batch processing step of, on condition that a total process volume for executing one or more jobs accumulated in the accumulation step becomes equal to or greater than a lower limit value predetermined for the in-charge process, executing the in-charge process on combination data in which one or more data that are process targets of the accumulated one or more jobs are combined into one. The batch process step includes a determination step of determining whether there exists a job that is not accumulated in the accumulation step and in which a previous process immediately before the in-charge process is now being executed, a first delay step of delaying start of the in-charge process until a prescribed time has elapsed since a start-enabled time at which the total process volume becomes equal to or greater than the lower limit value, and a second delay step of delaying start of the in-charge process until a job determined that the previous process is now being executed is accumulated in the accumulation step, if it is determined in the determination step that there exists a job in which the previous process is now being executed, before the prescribed time has elapsed since the start-enabled time.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a block diagram showing an exemplary hardware configuration of an MFP.

FIG. 4 shows an example of a process definition table.

FIG. 5 is a flowchart showing an exemplary flow of a job accepting process.

FIG. 8 shows an exemplary state of jobs.

FIG. 9 shows a state of jobs at a stage when a request for a character recognition process is made to a server.

FIG. 10 is a block diagram showing exemplary functions of a CPU of the MFP in a second embodiment and data stored in an EEPROM.

FIG. 13 is a flowchart showing an exemplary flow of batch processing in the second embodiment.

DESCRIPTION OF THE PREFERRED EMBODIMENTS

Figure 1:
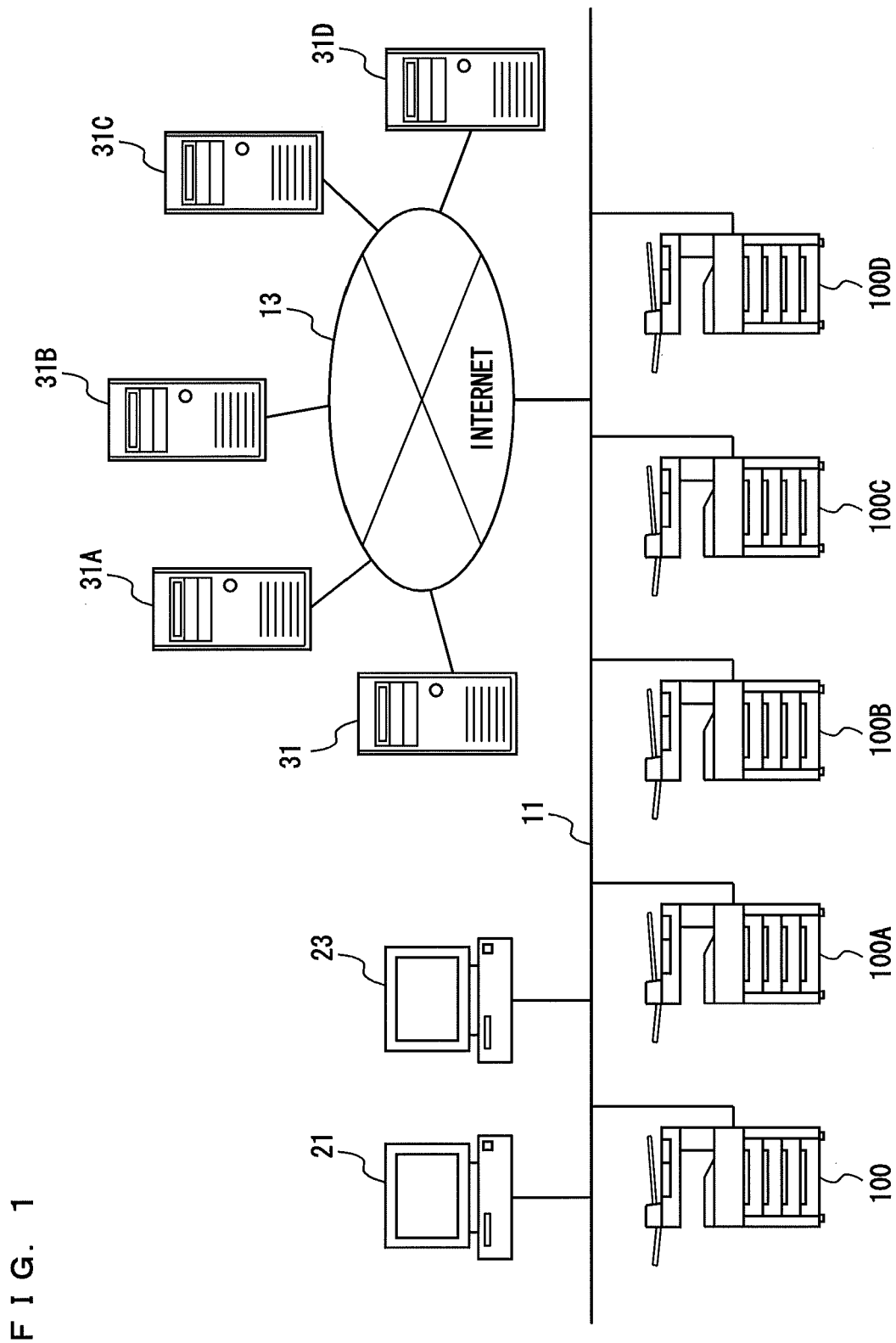
FIG. 1 is a diagram showing an overview of an image processing system in an embodiment of the present invention.

Embodiments of the present invention will be described below with reference to the figures. In the following description, the same parts are denoted with the same reference numerals. Their names and functions are also the same. Therefore, a detailed description thereof will not be repeated.

<First Embodiment>

FIG. 1 is a diagram showing an overview of an image processing system in an embodiment of the present invention. Referring to FIG. 1, an image processing system 1 includes five Multi-Function Peripherals (hereinafter referred to as "MFP") 100, 100A to 100D and personal computers (hereinafter referred to as "PC") 21 and 23, each being connected to a network 11, and five servers 31, 31A to 31D connected to the Internet 13.

Network 11 is a Local Area Network (LAN), which is either wired or wireless. Network 11 is not limited to a LAN but may be a Wide Area Network (WAN), the Internet, or a network using a general public line. Network 11 is connected to the Internet 13 through a gateway.

MFPs 100, 100A to 100D each are an example of an image processing apparatus. Servers 31, 31A to 31D each are a general computer, and their hardware configuration is well known and therefore a description thereof will not be repeated here. Servers 31, 31A to 31D function as Web servers capable of providing SaaS and provide paid data processing services. The data processing service is provided by servers 31, 31A to 31D in such a manner that a software function operating on each of servers 31, 31A to 31D is available online over a network. The kinds of data processing services provided by servers 31, 31A to 31D may be all the same or different from each other. Here, the kinds of data processing services provided by servers 31, 31A to 31D are different from each other, by way of example.

Servers 31, 31A to 31D each are installed with a data processing program for externally receiving data, processing the received data, and returning the processed data. The data processing is a process executed on input image data, and includes, for example, a character recognition process of performing optical character recognition (OCR) for conversion into character data, a translation process of translating characters, a color conversion process of converting a color in an image region in data, an edge enhancement process of enhancing edges in an image region in data, and a format conversion process of converting a data format. Here, server 31 is installed with a character recognition processing program for executing a character recognition process to provide a character recognition service. Server 31A is installed with a translation program for executing a translation process to provide a translation service. Server 31B is installed with a color conversion processing program for executing a color conversion process to provide a color conversion service. Server 31C is installed with an edge enhancement processing program for executing an edge enhancement process to provide an edge enhancement service. Server 31D is installed with a format conversion program for executing a format conversion process to provide a format conversion service.

The data processing services provided by servers 31, 31A to 31D are charged when being used. A variety of billing methods are known, and the present invention is not intended to be limited to any particular billing method.

The data processing service provided by servers 31, 31A to 31D is set to be available in any one of MFPs 100, 100A to 100D. MFPs 100, 100A to 100D are each set to be able to use the data processing service provided by servers 31, 31A to 31D. Here, MFP 100 is set to be able to use the character recognition service provided by server 31. MFP 100A is set to be able to use the translation service provided by server 31A. MFP 100B is set to be able to use the color conversion service provided by server 31B. MFP 100C is set to be able to use the edge enhancement service provided by server 31C. MFP 100D is set to be able to use the format conversion service provided by server 31D.

The process that MFP 100, 100A to 100D is set to be able to use from among the data processing services provided by servers 31, 31A to 31D is hereinafter referred to as an in-charge process. Specifically, the in-charge process of MFP 100 is a process of using the character recognition service provided by server 31. The in-charge process of MFP 100A is a process of using the translation service provided by server 31A. The in-charge process of MFP 100B is a process of using the color conversion service provided by server 31B. The in-charge process of MFP 100C is a process of using the edge enhancement service provided by server 31C. The in-charge process of MFP 100D is a process of using the format conversion service provided by server 31D.

PCs 21 and 23 are general computers, and their hardware configuration is well known and therefore a description thereof will not be repeated here. PCs 21 and 23 can communication with MFPs 100, 100A to 100D and servers 31, 31A to 31D via network 11.

In the image processing system in the present embodiment, a job is input to any one of MFPs 100, 100A to 100D by the user. A job defines data serving as a process target (data to be processed), one or more processes selected from a plurality of processes for the data, and the order of executing one or more processes. The plurality of processes may be any process that can be executed in any one of MFPs 100, 100A to 100D. The processes executable by MFPs 100, 100A to 100D include a process executed by a program or hardware installed in each of MFPs 100, 100A to 100D, as well as a process set available in each of MFPs 100, 100A to 100D, among the data processing services provided by servers 31, 31A to 31D. Upon input of a job, MFPs 100, 100A to 100D each specifies an apparatus that will execute the process, from among MFPs 100, 100A to 100D, according to the order defined by the input job, and allows the specified apparatus to execute the job.

FIG. 1 shows five MFPs 100, 100A to 100D, two PCs 21 and 23, and five servers 31, 31A to 31D. However, the number of devices is not limited as long as one or more MFPs 100 and one or more servers 31 are connected to network 11 or the Internet 13.

MFPs 100, 100A to 100D have the same hardware and functions. Therefore, MFP 100 will be taken as an example, unless otherwise specified.

FIG. 2 is a block diagram showing an exemplary hardware configuration of the MFP. Referring to FIG. 2, MFP 100 includes a main circuit 110, an image scanning unit 130 for scanning a document, an automatic document feeder 120 for conveying a document to document scanning unit 130, an image forming unit 140 for forming a still image output by document scanning unit 130 scanning a document on paper, a paper feed unit 150 for supplying paper to image forming unit 140, and an operation panel 160 serving as a user interface.

Main circuit 110 includes a CPU 111, a communication interface (I/F) portion 112, a ROM (Read Only Memory) 113, a RAM (Random Access Memory) 114, an EEPROM (Electrically Erasable and Programmable ROM) 115, a hard disk drive (HDD) 116 serving as mass storage device, a facsimile portion 117, and an external storage device 119 to which a CD-ROM (Compact Disc-Read Only Memory) 119A is attached.

CPU 111 is connected to automatic document feeder 120, document scanning unit 130, image forming unit 140, paper feeding unit 150, and operation panel 160 to control MFP 100 on the whole. ROM 113 stores a program executed by CPU 111 and data necessary to execute the program. RAM 114 is used as a work area when CPU 111 executes a program. RAM 114 temporarily stores still images successively sent from document scanning unit 130.

Operation panel 160 is provided on a top surface of MFP 100 and includes a display portion 160A and an operation portion 160B. Display portion 160A is a display such as a liquid crystal display (LCD) or an organic ELD (Electroluminescence Display) and displays instruction menus to users, information about the acquired image data, and the like. Operation portion 160B has a plurality of keys and accepts a variety of instructions and input of data such as characters and numerals according to the user's operation corresponding to the keys. Operation portion 160B further includes a touch panel provided on display portion 160A.

Communication I/F portion 112 is an interface for connecting MFP 100 to network 11. CPU 111 communicates with PCs 21 and 23 and server 31 through communication I/F portion 112 for data transmission/reception. Communication I/F portion 112 communicates with servers 31A to 31E connected to the Internet via network 11 for data transmission/reception.

Facsimile portion 117 is connected to a Public Switched Telephone Network (PSTN) to transmit facsimile data to the PSTN or receive facsimile data from the PSTN. Facsimile portion 117 stores the received facsimile data into HDD 116 or outputs the same to image forming unit 140. Image forming unit 140 prints the facsimile data received by facsimile portion 117 on paper. Facsimile portion 117 converts the data stored in HDD 116 into facsimile data for transmission to a facsimile machine connected to the PSTN.

CD-ROM 119A is attached to external storage device 119. CPU 111 can access CD-ROM 119A through external storage device 119. CPU 111 loads the program recorded on CD-ROM 119A inserted in external storage device 119 into RAM 114 for execution. The program executed by CPU 111 is not limited to a program stored in CD-ROM 119A, and a program stored in HDD 116 may be loaded into RAM 114 for execution. In this case, another computer connected to network 11 may overwrite the program stored in HDD 116 of MFP 100 or additionally writes a new program. Furthermore, MFP 100 may download a program from another computer connected to network 11 and store the program into HDD 116. The program referred to herein includes not only a program directly executable by CPU 111 but also a source program, a compressed program, and an encrypted program.

A recording medium for storing a program executed by CPU 111 is not limited to CD-ROM 119A but may be an optical disk (MO (Magnetic Optical Disc)/(MD (Mini Disc)/ DVD (Digital Versatile Disc)), an IC card, an optical card, or a semiconductor memory such as a mask ROM, an EPROM (Erasable Programmable ROM), or an EEPROM (Electrically EPROM).

Figure 3:
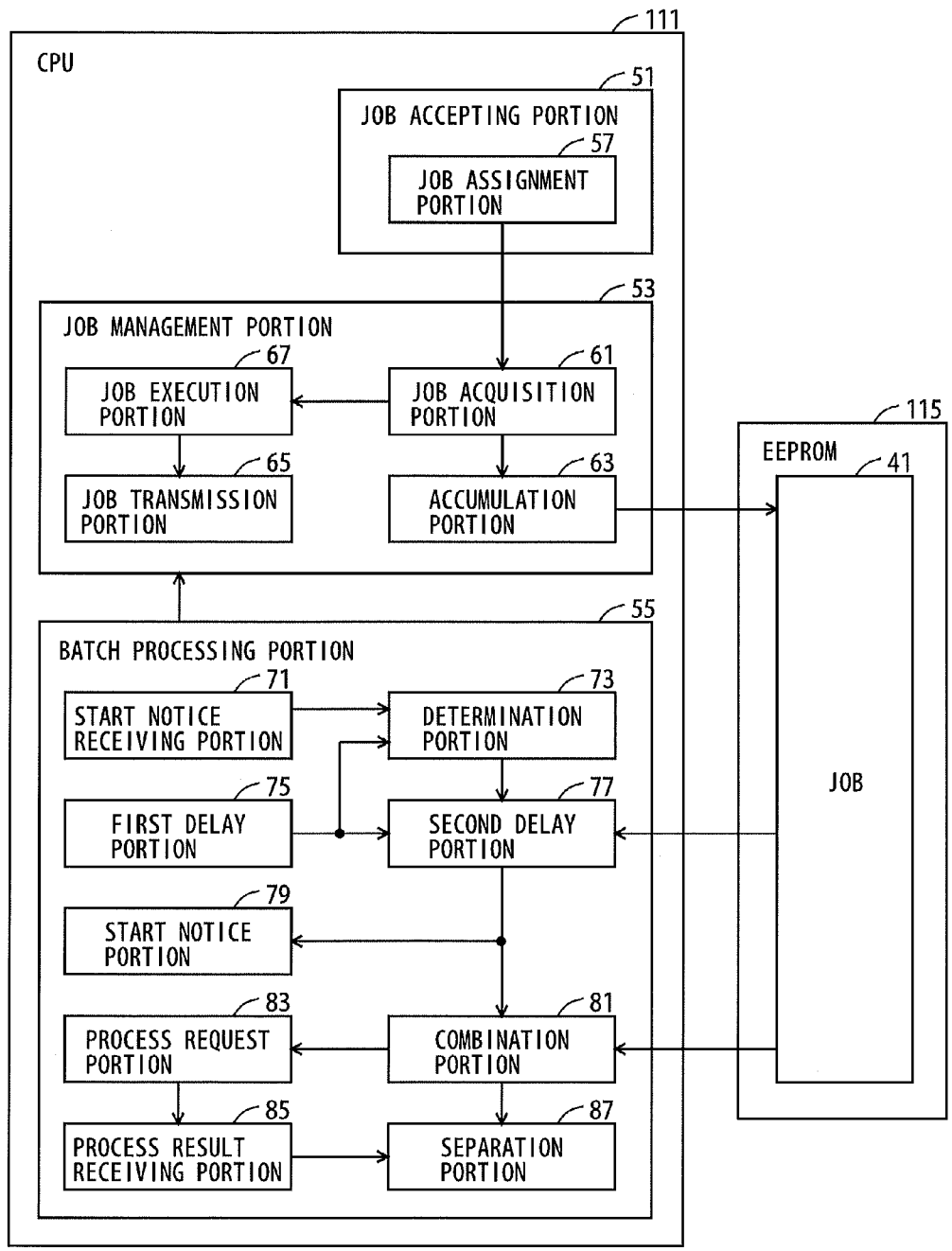
FIG. 3 is a block diagram showing exemplary functions of a CPU of the MFP and data stored in an EEPROM.

FIG. 3 is a block diagram showing exemplary functions of the CPU of the MFP and data stored in the EEPROM. The functions shown in FIG. 3 are implemented by CPU 111 of MFP 100 executing a job execution program stored in ROM 114, EEPROM 115, HDD 116, or CD-ROM 119A.

Referring to FIG. 3, CPU 111 includes a job accepting portion 51 for accepting a job, a job management portion 53 for managing a job, and a batch processing portion 55. Job accepting portion 51 displays a job acceptance screen on display portion 160A and accepts a job input to operation portion 160B by the user according to the job acceptance screen. The job acceptance screen includes an area in which data serving as a process target is designated, an area in which one or more processes are selected from a plurality of predetermined processes, and an area in which the order of executing the selected one or more processes is designated.

Job accepting portion 51 displays the job acceptance screen based on a process definition table stored beforehand in EEPROM 115. The process definition table includes, for each of a plurality of processes, a process definition record which at least includes process identification information for identifying a process and apparatus identification information for identifying an apparatus that executes the process. The process record may include description of the process identified by the process identification information and billing information concerning a fee charged. The job acceptance screen displays the respective process identification information of a plurality of process definition records included in the process definition table, in a selectable manner.

Here, the process definition table includes process definition records corresponding to the scan process, the image forming process, the data transmission process, and the facsimile transmission process that are executable by MFP 100, and in addition, process definition records corresponding to the processes of using the data processing services provided by servers 31, 31A to 31D that MFPs 100, 100A to 100D are set to be able to use.

The process definition record corresponding to the process of using the data processing service provided by server 31 that MFP 100 is set to be able to use is generated in MFP 100 and added to the process definition table at a stage when MFP 100 is set to be able to use the character recognition service provided by server 31.

The process definition record corresponding to the process of using the data processing service provided by server 31A that MFP 100A is set to be able to use is generated in MFP 100A and received from MFP 100A to be added to the process definition table at a stage when MFP 100A is set to be able to use the translation service provided by server 31A. The process definition record corresponding to the process of using the data processing service provided by server 31B that MFP 100B is set to be able to use is generated in MFP 100B and received from MFP 100B to be added to the process definition table at a stage when MFP 100B is set to be able to use the color conversion service provided by server 31B. The process definition record corresponding to the process of using the data processing service provided by server 31C that MFP 100C is set to be able to use is generated in MFP 100C and received from MFP 100C to be added to the process definition table at a stage when MFP 100C is set to be able to use the edge enhancement service provided by server 31C. The process definition record corresponding to the process of using the data processing service provided by server 31D that MFP 100D is set to be able to use is generated in MFP 100D and received from MFP 100D to be added to the process definition table at a stage when MFP 100D is set to be able to use the format conversion service provided by server 31D.

FIG. 4 shows an example of the process definition table. Referring to FIG. 4, the process definition table refers to the process definition table registered in MFP 100. The process definition table includes nine process definition records corresponding to the respective nine processes. The process definition record includes an item of process identification information, an item of apparatus identification information, an item of content, and an item of billing information. The item of billing information includes an item of before discount, an item of after discount, and an item of discount terms. The process identification information for specifying a process is set in the item of process identification information. The apparatus identification information for identifying an apparatus that executes the process is set in the item of apparatus identification information. Here, the apparatus identification information of MFPs 100, 100A to 100D is first to fifth MFPs, respectively. Information for describing a process is set in the item of content. Information about the rate of charge on the process being executed is set in the item of billing information. A condition for determining the rate is set in the item of discount terms. The rate adopted when the discount terms are not satisfied is set in the item of before discount. The rate adopted when the discount terms are satisfied is set in the item of after discount.

The four process definition records in which "scan," "image formation," "data transmission," and "FAX transmission" are set in the item of process identification information indicate the scan process, the image forming process, the data transmission process, and the facsimile transmission process, which are executed in MFP 100. In all the four process definition records, the apparatus identification information "first MFP" of MFP 100 is set in the item of apparatus identification information, and the billing information is blank.

The process definition record in which "character recognition" is set in the item of process identification information corresponds to a process of using the character recognition service provided by server 31 that MFP 100 is set to be able to use. The apparatus identification information "first MFP" of MFP 100 is set in the item of apparatus identification information. This is because MFP 100 is set to be able to use the character recognition service provided by server 31. As for the billing information, 10 yen per character is set as the rate in the case where the requested process volume for the character recognition service is less than 10000 characters, whereas 5 yen per character is set as the rate in the case where the requested process volume is equal to or greater than 10000 characters.

The process definition record in which "translation" is set in the item of process identification information corresponds to the process of using the translation service provided by server 31A that MFP 100A is set to be able to use. The apparatus identification information "second MFP" of MFP 100A is set in the item of the apparatus identification information. This is because MFP 100A is set to be able to use the translation service provided by server 31A. As for the billing information, 20 yen per character is set as the rate in the case where the requested process volume for the translation service is less than 10000 characters, whereas 10 yen per character is set as the rate in the case where the requested process volume is equal to or greater than 10000 characters.

The process definition record in which "color conversion" is set in the item of process identification information corresponds to the process of using the color conversion service provided by server 31B that MFP 100B is set to be able to use. The apparatus identification information "third MFP" of MFP 100B is set in the item of the apparatus identification information. This is because MFP 100B is set to be able to use the color conversion service provided by server 31B. As for the billing information, 50 yen per page is set as the rate in the case where the requested process volume for the color conversion service is less than 100 pages, whereas 30 yen per page is set as the rate in the case where the requested process volume is equal to or greater than 100 pages.

The process definition record in which "edge enhancement" is set in the item of process identification information corresponds to the process of using the edge enhancement service provided by server 31C that MFP 100C is set to be able to use. The apparatus identification information "fourth MFP" of MFP 100C is set in the item of the apparatus identification information. This is because MFP 100C is set to be able to use the edge enhancement service provided by server 31C. As for the billing information, 20 yen per page is set as the rate in the case where the requested process volume for the edge enhancement service is less than 100 pages, whereas 10 yen per page is set as the rate in the case where the requested process volume is equal to or greater than 100 pages.

The process definition record in which "format conversion" is set in the item of process identification information corresponds to the process of using the format conversion service provided by server 31D that MFP 100D is set to be able to use. The apparatus identification information "fifth MFP" of MFP 100D is set in the item of the apparatus identification information. This is because MFP 100D is set to be able to use the format conversion service provided by server 31D. As for the billing information, 10 yen per page is set as the rate in the case where the requested process volume for the format conversion service is less than 100 pages, whereas 5 yen per page is set as the rate in the case where the requested process volume is equal to or greater than 100 pages.

The process definition table stored in MFP 100 may include a process record including a process executable in any one of other MFPs 100A to 100D and the process identification information of the apparatus.

Returning to FIG. 3, job accepting portion 51 acquires data designated in the area of the job acceptance screen in which data serving as a process target is designated. For example, when scan data is designated as the data serving as a process target, document scanning unit 130 is controlled such that the image data output by document scanning unit 130 scanning a document is acquired as the data serving as a process target. When data stored in HDD 116 is designated, the designated data is read out from HDD 116, and the read-out data is acquired as the data serving as a process target.

Job accepting portion 51 generates a job which includes the acquired data, the process identification information of each of the designated one or more processes, and the order of executing one or more processes. Job accepting portion 51 includes a job assignment portion 57. Job assignment portion 57 outputs the generated job to the apparatus that is the first to execute a process, among MFPs 100, 100A to 100D. Specifically, job assignment portion 57 specifies, from among MFPs 100, 100A to 100D, an apparatus that executes the first process in the execution order defined by the generated job. If the specified apparatus is MFP 100, job assignment portion 57 outputs the job to job management portion 53. If the specified apparatus is any one of MFPs 100A to 100D, job assignment portion 57 transmits the job to the specified one of MFPs 100A to 100D through communication I/F portion 112.

In the present embodiment, job accepting portion 51 is formed in CPU 111 in each of MFPs 100, 100A to 100D, so that a job can be accepted in any of MFPs 100, 100A to 100D. Job accepting portion 51 may be formed in any one of MFPs 100, 100A to 100D or may be formed in one or more selected from MFPs 100, 100A to 100D. Job accepting portion 51 may be formed in both of PCs 21 and 23.

Job management portion 53 includes a job acquisition portion 61 for acquiring a job, an accumulation portion 63 for accumulating jobs, a job transmission portion 65 for transmitting a job, and a job execution portion 61 for executing a job. Job acquisition portion 61 acquires a job input from job assignment portion 57. When communication I/F portion 112 receives a job from any one of other MFPs 100A to 100D, job acquisition portion 61 acquires the received job. The job acquired by job acquisition portion 61 is a job in which a process that has not yet been executed and is the first one in the execution order among a plurality of processes included therein is determined to be executed in MFP 100. Job acquisition portion 61 further acquires a job input from batch processing portion 55 described later.

Job acquisition portion 61 specifies, as a target process to be executed next, a process that has not yet been executed and is the first one in the execution order among a plurality of processes included in the acquired job. When a plurality of jobs are input from batch processing portion 55, job acquisition portion 61 specifies a target process for each of a plurality of input jobs. Then, job acquisition portion 61 determines whether the target process is the in-charge process of MFP 100. The in-charge process of MFP 100 is a process of using the character recognition service provided by server 31. If the target process is the in-charge process, job acquisition portion 61 outputs the job to accumulation portion 63. If not the in-charge process, job acquisition portion 61 outputs the job to job execution portion 67.

Accumulation portion 63 stores the job input from job acquisition portion 61 into EEPROM 115. A job 41 is thus stored in EEPROM 115.

Job execution portion 67 executes a process defined by the job on the data included in the job input from job acquisition portion 61. Examples of the process include an image forming process, a data transmission process, and a facsimile transmission process. After executing the job, if the job defines a process not yet executed, job execution portion 67 outputs the job including the processed data to job transmission portion 65.

When a job is input from job execution portion 67, job transmission portion 65 specifies, as a target process to be executed next, a process that has not yet been executed and is the first one in the execution order among a plurality of processes included in the input job. Then, job transmission portion 65 specifies a subsequent process apparatus that should execute the target process, from among MFPs 100A to 100D, and transmits the job to the specified subsequent process apparatus through communication I/F portion 112.

Batch processing portion 55 calculates the total process volume for server 31 to execute data processing on data included in all the jobs 41 stored in EEPROM 115. Then, batch processing portion 55 asks server 31 of processing on condition that the total process volume is equal to or greater the a lower limit value predetermined for the in-charge process. The lower limit value is the value set in the item of discount terms of billing information in the process definition table. Here, the lower limit value is "10000 characters."

Batch processing portion 55 includes a start notice receiving portion 71 receiving a start notice transmitted by any one of other MFPs 100A to 100D, a determination portion 73 for determining whether there exists a job that includes the in-charge process and in which the previous process immediately before the in-charge process is now being executed, a first delay portion 75 and a second delay portion 77 for delaying the start of the in-charge process, a start notice portion 79 for giving a notice that the in-charge process is started, a combination portion 81 for combining a plurality of data, a process request portion 83 for asking server 31 to execute a process on the combination data, a process result receiving portion 85 receiving a process result from server 31, and a separation portion 87 for separating the processed data.

First delay portion 75 monitors jobs 41 stored in EEPROM 115, calculates the total process volume, and delays the start of the in-charge process until a prescribed time has passed since a start-enabled time at which the total process volume becomes equal to or greater than the lower limit value. The prescribed time is a predetermined time T1. When the total process volume becomes equal to or greater than the lower limit value, first delay portion 75 outputs, to determination portion 73 and second delay portion 77, a condition-met signal indicating that the conditions for executing the in-charge process are met, and counts the elapsed time since the start-enabled time. When the time counted from the start-enabled time reaches the predetermined time T1, first delay portion 75 outputs a first start instruction to determination portion 73 and second delay portion 77.

If an existence signal is input from determination portion 73 after the condition-met signal is input from first delay portion 75 and before the first start instruction is input from first delay portion 75, second delay portion 77 delays the start of the in-charge process until the job included in the existence signal is stored into EEPROM 115. The existence signal, which will be described later, is a signal output by determination portion 73 after the condition-met signal is input from first delay portion 75 and before the first start instruction is input from first delay portion 75, to indicate that there exists a job that includes the in-charge process and in which the previous process immediately before the in-charge process is now being executed. After the existence signal is input from determination portion 73, second delay portion 77 monitors jobs stored in EEPROM 115, and when detecting that the job included in the existence signal is stored into EEPROM 115, outputs an execution instruction to combination portion 81 and a start notice instruction to start notice portion 79.

On the other hand, if the first start instruction is input from first delay portion 75, without the existence signal being input from determination portion 73, after the condition-met signal is input from first delay portion 75, second delay portion 77 outputs an execution instruction to combination portion 81 and outputs a start notice instruction to start notice portion 79.

Start notice portion 79 specifies a subsequent process apparatus in charge of the subsequent process that follows the in-charge process of MFP 100 in the execution order, among a plurality of processes included in job 41, for each of all the jobs 41 stored in EEPROM 115. Then, a notice that the in-charge process of MFP 100 is started is given to the specified subsequent process apparatus. Specifically, a start notice signal including the job identification information for identifying job 41 is transmitted to the subsequent process apparatus through communication I/F portion 112. The start notice signal is a signal indicating that execution of the previous process is started. If a plurality of jobs 41 are stored in EEPROM 115, a plurality of subsequent process apparatuses may be specified. Start notice portion 79 outputs the start notice signal to a plurality of specified subsequent process apparatuses.

Start notice receiving portion 71 controls communication I/F portion 112 to receive the start notice signal from any one of other MFPs 100A to 100D. When receiving the start notice signal from any one of other MFPs 100A to 100D, start notice receiving portion 71 outputs the received start notice signal to determination portion 73. Any one of other MFPs 100A to 100D, for example, MFP 100A, transmits the start notice signal to MFP 100, if MFP 100 is the subsequent process apparatus in charge of the subsequent process that follows the in-charge process of MFP 100A in the execution order in the job that includes the in-charge process which MFP 100A starts executing. The start notice signal includes job identification information of the job that includes the in-charge process which MFP 100A starts executing.

If the start notice signal is input from start notice receiving portion 71 after the condition-met signal is input from first delay portion 75 and before the first start instruction is input, determination portion 73 determines that there exists a job that includes the in-charge process of MFP 100 and in which the previous process immediately before the in-charge process is now being executed. Determination portion 73 outputs the existence signal to second delay portion 77 if the start notice signal is input from start notice receiving portion 71 after the condition-met signal is input from first delay portion 75 and before the first start instruction is input. The existence signal includes the job identification information included in the start notice signal.

If the first start instruction is input, without the start notice signal being input from start notice receiving portion 71, after the condition-met signal is input from first delay portion 75, determination portion 73 determines that there exists no job that includes the in-charge process of MFP 100 and in which the previous process immediately before the in-charge process is now being executed, and outputs nothing to second delay portion 77.

When the execution instruction is input from second delay portion 77, combination portion 81 reads out all the jobs 41 stored in EEPROM 115 and combines all the data included in the read-out jobs 41 to generate combination data. Combination portion 81 also generates an association table in which job 41 including the data being combined is associated with the position of the data in the combination data. Combination portion 81 outputs the combination data to process request portion 83 and outputs the association table to separation portion 87.

The association table includes an association record which includes the job identification information for identifying job 41 and the position in combination data of the data included in the job 41. For example, if the data included in job 41 is image data, combination portion 81 generates combination data in which data is sectioned by pages. The association table then associates the job identification information with the page number.

Process request portion 83 asks server 31 to execute a process on the combination data. Specifically, process request portion 83 transmits the combination data and a request command to server 31 through communication I/F portion 112. Server 31 receiving the combination data and the request command executes a character recognition process on the combination data and returns the data subjected to character recognition. Process result receiving portion 85 then controls communication I/F portion 112 to receive, as a process result, the data produced by server 31 executing a character recognition process on the combination data. Process result receiving portion 85 outputs the data received as a process result to separation portion 87.

Separation portion 87 receives the association table from combination portion 81 and receives data as a process result from process result receiving portion 85. Separation portion 87 separates the data input as a process result from process result receiving portion 85 into a plurality of portions corresponding to a plurality of jobs, respectively, according to the association table, and substitutes the data of the corresponding job with each of a plurality of separated portions. A mark indicating that the process has been executed is added to the history of the in-charge process among a plurality of processes in the job. Separation portion 87 outputs a plurality of jobs to job management portion 53.

In FIG. 3, the functions of CPU 111 of MFP 100 have been described. The functions of CPU 111 of each of MFPs 100A to 100D are similar to the functions shown in FIG. 3 except that the in-charge process is different. Specifically, the in-charge process of MFP 100A is a process of using the translation serve provided by server 31A. Therefore, a job including a translation process as a target process is accumulated in MFP 100A, and when the total process volume reaches 10000 characters or more, a request for processing is made to server 31A. The in-charge process of MFP 100B is a process of using the color conversion service provided by server 31B. Therefore, a job including a color conversion process as a target process is accumulated in MFP 100B, and when the total process volume reaches 100 pages or more, a request for processing is made to server 31B. The in-charge process of MFP 100C is a process of using the edge enhancement service provided by server 31C. Therefore, a job including an edge enhancement process as a target process is accumulated in MFP 100C, and when the total process volume reaches 100 pages or more, a request for processing is made to server 31C. The in-charge process of MFP 100D is a process of using the format conversion service provided by server 31D. Therefore, a job including a format conversion process as a target process is accumulated in MFP 100D, and when the total process volume reaches 100 pages or more, a request for processing is made to server 31D.

FIG. 5 is a flowchart showing an exemplary flow of a job accepting process. The job accepting process is a process executed by CPU 111 when CPU 111 of MFP 100 executes the job execution program stored in ROM 114, EEPROM 115, HDD 116, or CD-ROM 119A. Referring to FIG. 5, CPU 111 determines whether data is designated (step S01). The process waits until data is designated (NO in step S01). If data is designated (YES in step S01), the process proceeds to step S02. The job acceptance screen is displayed on display portion 160A, and it is determined whether data is designated by the user according to the job acceptance screen.

In step S02, the designated data is acquired. The process then proceeds to step S03. For example, if scan data is designated, document scanning unit 130 is controlled so that image data output by document scanning unit 130 scanning a document is acquired as data serving as a process target. If the data stored in HDD 116 is designated, the designated data is read out from HDD 116, so that the read-out data is acquired as data serving as a process target.

In step S03, it is determined whether a process is designated. It is determined whether the user designates a process according to the job acceptance screen appearing on display portion 160A. The process waits until a process is designated (NO in step S03). When a process is designated (YES in step S03), the process proceeds to step S04. In step S04, process conditions are accepted. Then, it is determined whether the setting is finished (step S05). It is determined that the setting is finished if the user inputs an operation of designating a setting end key preset on operation portion 160B. If the setting is finished, the process proceeds to step S06. If not, the process returns to step S03. Therefore, in the job accepting process, one or more processes and process conditions for executing the processes are accepted. If the process proceeds to step S06, a job is generated. The job includes the data acquired in step S01, one or more processes designated in step S03, and the execution order of executing one or more processes. The execution order is determined according to the order in which one or more processes have been accepted.

In the next step S06, an apparatus in charge of the first process in the execution order is specified. Referring to the process definition table stored in EEPROM 115, the process definition record that includes the process identification information of the first process is extracted, and the apparatus specified by the apparatus identification information set in the item of apparatus identification information in the extracted process definition record is specified as the apparatus in charge of the first process.

In step S07, the job is assigned to the specified apparatus in charge. The job generated in step S01 to step S05 is assigned to the apparatus in charge that is specified from among MFPs 100, 100A to 100D.

In the next step S08, the job is output to the apparatus in charge. If the specified apparatus in charge is MFP 100, the job is output to a process that executes a job management process, which will be described later, of MFP 100. If the specified apparatus in charge is any one of MFPs 100A to 100D, the job is transmitted to the specified apparatus in charge among MFPs 100A to 100D through communication I/F portion 112.

Figure 6:
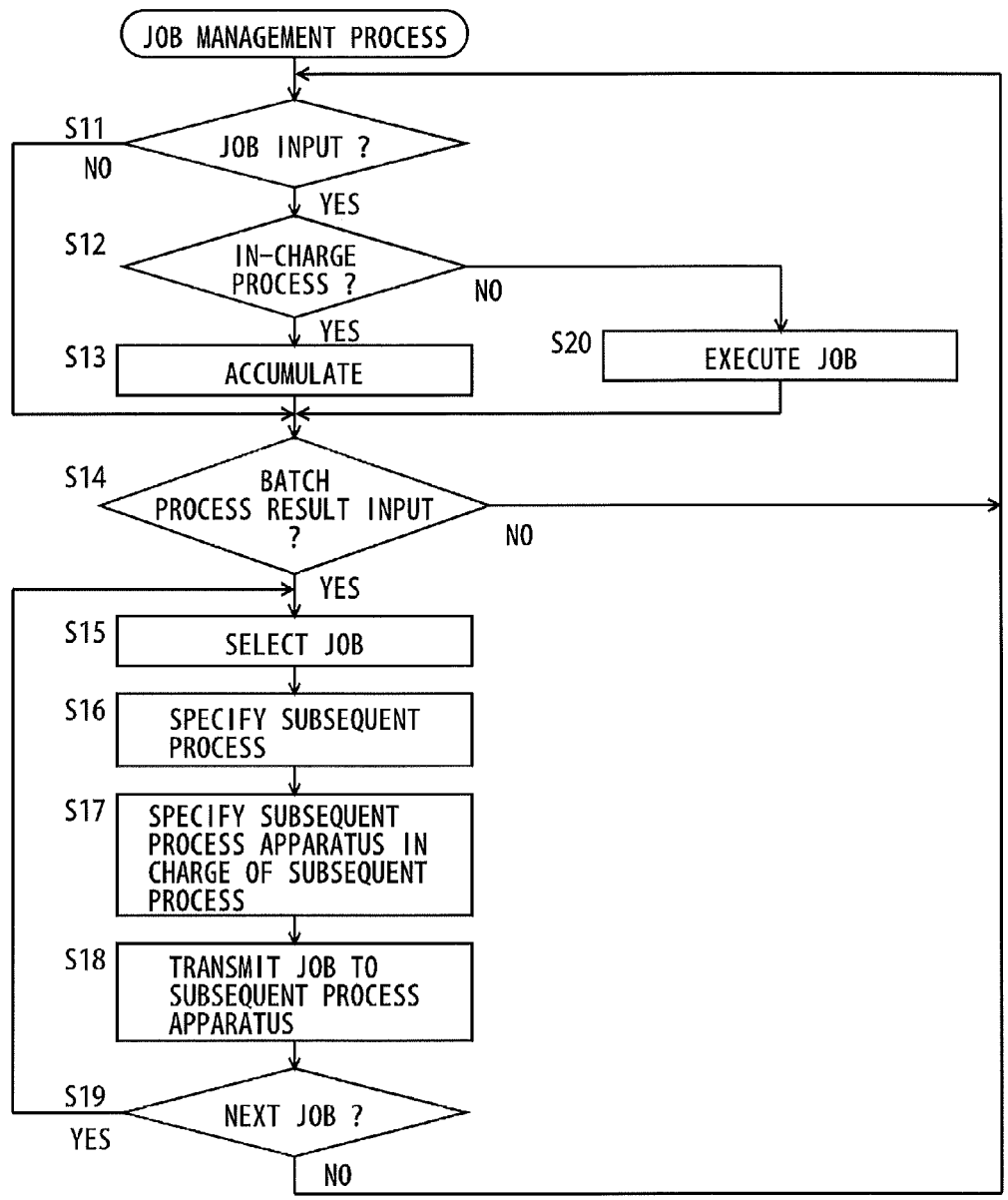
FIG. 6 is a flowchart showing an exemplary flow of a job management process.

FIG. 6 is a flowchart showing an exemplary flow of a job management process. The job management process is a process executed by CPU 111 when CPU 111 of MFP 100 executes the job execution program stored in ROM 114, EEPROM 115, HDD 116, or CD-ROM 119A.

Referring to FIG. 6, in step S11, it is determined whether a job is input. If a job is input, the process proceeds to step S12. If not, the process proceeds to step S14. In a case where a process that executes the job accepting process shown in FIG. 5 outputs the job, the job is input from the process that executes the job accepting process. In a case where communication I/F portion 112 receives a job from any one of other MFPs 100A to 100D, the job is input from any one of other MFPs 100A to 100D.

It is determined whether a target process to be executed next, among a plurality of processes included in the input job, is the in-charge process. As the in-charge process of MFP 100 is a character recognition process, it is determined whether the target process is a character recognition process. If a target process is the in-charge process, the process proceeds to step S13. If not, the process proceeds to step S20. In step S13, the job input in step S11 is stored into EEPROM 115, and the process then proceeds to step S14. On the other hand, in step S20, the target process is executed, and the process then proceeds to step S14. The target process executed in step S20 is a process that is executed in MFP 100, for example, an image forming process, a data transmission process, and a facsimile transmission process.

In step S14, it is determined whether a batch process result is input. It is determined whether a result of batch processing is input from a process that executes batch processing described later. If a result of batch processing is input, the process proceeds to step S15. If not, the process returns to step S11.

In step S15, one of a plurality of jobs that are targets of batch processing is selected. In the next step S16, of a plurality of processes included in the selected job, the subsequent process that follows the in-charge process in the execution order is specified. Then, the subsequent process apparatus in charge of the specified subsequent process is specified from among MFPs 100A to 100D (step S17). Specifically, referring to the process definition table stored in EEPROM 115, the apparatus specified by the apparatus identification information set in the item of apparatus identification information in the process definition record that includes the process identification information of the subsequent process is specified as the subsequent process apparatus.

In the next step S18, the job selected in step S15 is transmitted to the specified subsequent process apparatus. The job transmitted to the subsequent process apparatus includes data that is a part of the batch process result input in step S14 which corresponds to the job selected in step S15.

Then, in the next step S19, it is determined whether there exists a job to be selected as a next process target from among a plurality of jobs that are targets of batch processing. If there exists a job not selected in step S15, the process returns to step S15. If not, the process returns to step S11.

Figure 7:
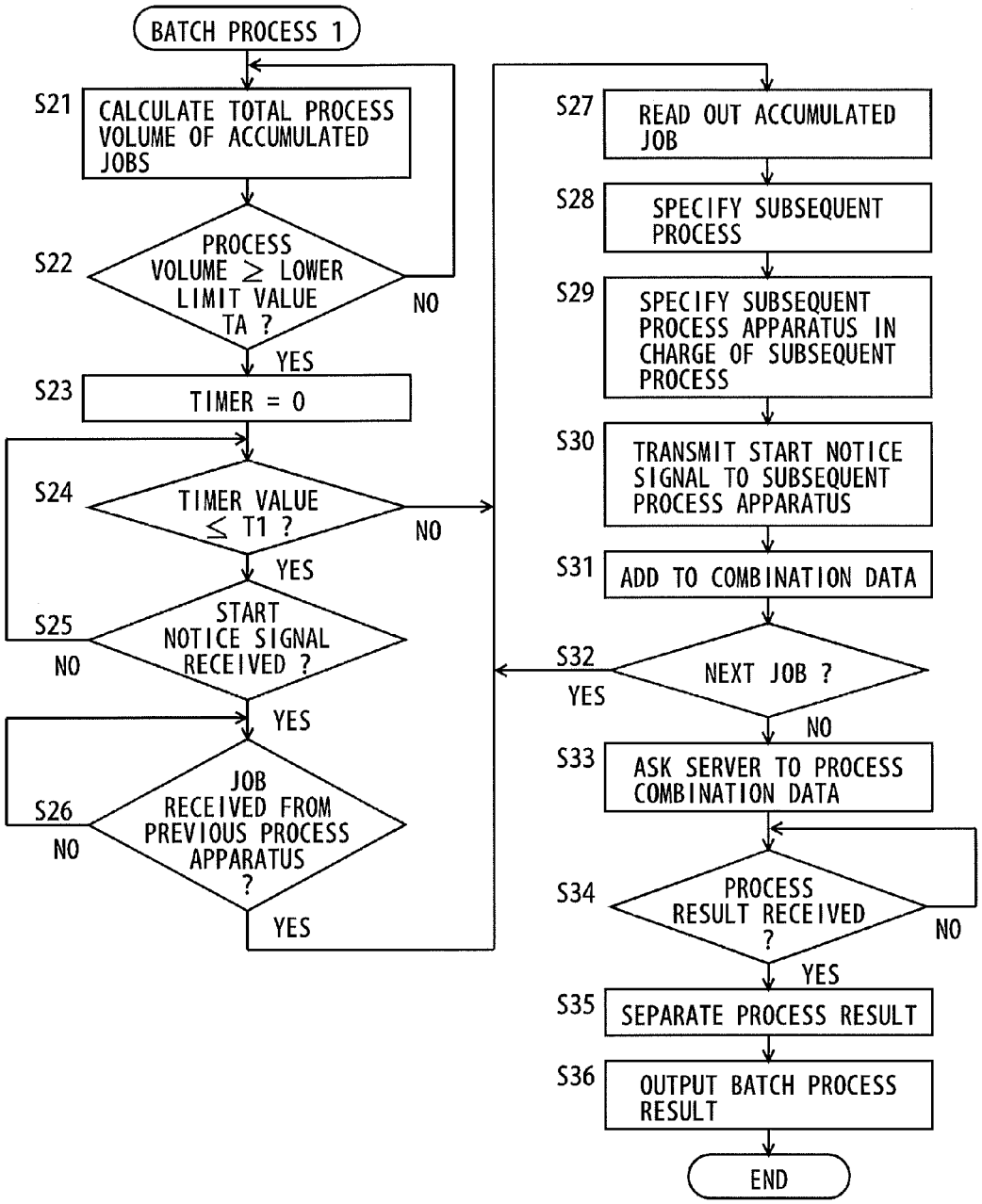
FIG. 7 is a flowchart showing an exemplary flow of batch processing.

FIG. 7 is a flowchart showing an exemplary flow of batch processing. The batch processing is a process executed by CPU 111 when CPU 111 of MFP 100 executes the job execution program stored in ROM 114, EEPROM 115, HDD 116, or CD-ROM 119A.

Referring to FIG. 7, CPU 111 calculates the total process volume of the accumulated jobs (step S21). CPU 111 calculates the total process volume for server 31 to execute data processing, which is here character recognition, on data included in all the jobs 41 stored in EEPROM 115. Then, it is determined whether the calculated total process volume is equal to or greater than a lower limit value TA predetermined for the in-charge process (step S22). The lower limit value TA is a value set in the item of discount terms of billing information in the process definition table, here, "10000 characters." If the total process volume is equal to or greater than the lower limit value TA, the process proceeds to step S23. If not, the process returns to step S21. In other words, the batch processing allows jobs to be stored into EEPROM 115 until the total process volume in the case where a request for a character recognition process is made to server 31 becomes equal to or greater than the lower limit value TA.

In step S23, a timer is set to "0." The timer "0" counts the elapsed time since jobs 41 equivalent to the total process volume equal to or greater than the lower limit value TA are stored into EEPROM 115. In step S24, it is determined whether the timer value is equal to or smaller than a threshold value T1. If the timer value is equal to or smaller than the threshold value T1, the process proceeds to step S25. If not, the process proceeds to step S27. In step S25, it is determined whether the start notice signal is received. It is determined whether communication I/F portion 112 receives the start notice signal from any one of other MFPs 100A to 100D. If the start notice signal is received, the process proceeds to step S26. If not, the process returns to step S24. In other words, step S26 is executed if the start notice signal is received before the time of the threshold value T1 has elapsed since jobs 41 equivalent to the total process volume equal to or greater than the lower limit value TA are stored into EEPROM 115. Otherwise, step S26 is not executed.

In step S26, the process waits until a job is received from the previous process apparatus that has transmitted the start notice signal. If a job is received, the process proceeds to step S27.

In step S27, the accumulated job is read out. Specifically, one of jobs 41 stored in EEPROM 115 is selected and read out. Then, the subsequent process is specified from the read-out job (step S28). Of a plurality of processes included in the job, a process that follows the in-charge process in the execution order is specified as the subsequent process. Then, the subsequent process apparatus in charge of the specified subsequent process is specified from among MFPs 100A to 100D (step S29). Specifically, referring to the process definition table stored in EEPROM 115, the apparatus specified by the apparatus identification information set in the item of apparatus identification information in the process definition record that includes the process identification information of the subsequent process is specified as the subsequent process apparatus.

In the next step S30, the start notice signal is transmitted to the specified subsequent process apparatus. The start notice signal includes the job identification information for identifying the job read out in step S27. In the next step S31, the data included in the job read out in step S27 is added to the combination data. In the next step S32, it is determined whether there exists a job to be selected as a next process target, among jobs 41 stored in EEPROM 115. If there exists a job that has not been read out in step S27, the process returns to step S27. If not, the process proceeds to step S33. The process in step S27 to step S31 is executed for all the jobs 41 stored in EEPROM 115.

In step S33, a request for processing the combination data is made to server 31. Specifically, the combination data and a request command are transmitted to server 31 through communication I/F portion 112. Server 31 receiving the combination data and the request command executes a character recognition process on the combination data and returns data subjected to character recognition. In the next step S34, it is determined whether the data produced by executing a character recognition process on the combination data is received as a process result from server 31. The process waits until a process result is received from server 31 (NO in step S34). If a process result is received (YES in step S34), the process proceeds to step S35.

In step S35, the process result received from server 31 is separated into a plurality of portions corresponding to a plurality of jobs, respectively. Then, each of a plurality of separated portions is output as a process result for each of a plurality of jobs. Specifically, each of a plurality of separated portions of the data received as the process result is substituted for the data of the corresponding job, and a mark indicating that the process has been executed is added as the history of the in-charge process among a plurality of processes of the job. Then, a plurality of jobs having data substituted with the process results are output. Here, the jobs are output to the process that executes the job management process shown in FIG. 6.

FIG. 8 shows an exemplary state of jobs. Referring to FIG. 8, shown is a state in which five jobs identified by the job identification information "JOB01," "JOB02," "JOB03," "JOB04," and "JOB05" are successively input. The jobs are shown with the process identification information arranged according to the execution order. For example, the job having the job identification information "JOB01" indicates the process identification information "edge enhancement," "character recognition," "format conversion," and "data transmission" in the first to fourth places, which indicates that a process enhancement process is executed in the first place, a character recognition process is executed in the second place, a format conversion process is executed in the third place, and a data transmission process is executed in the fourth place. The job having the job identification information "JOB02" indicates that an edge enhancement process is executed in the first place, a character recognition process is executed in the second place, a format conversion process is executed in the third place, and an image forming process is executed in the fourth place. The job having the job identification information "JOB03" and the job having the job identification information "JOB04" indicate that a character recognition process is executed in the first place, a format conversion process is executed in the second place, and an image forming process is executed in the third place. The job having the job identification information "JOB05" indicates that a character recognition process is executed in the first place, a format conversion process is executed in the second place, and a facsimile transmission process is executed in the third place.

A description will be given of a state of jobs at a stage immediately after the job having the job identification information "JOB05" is input, wherein the five jobs are input to image processing system 1 in the order of the job identification information "JOB01," "JOB02," "JOB03," "JOB04," and "JOB05." The jobs having the job identification information "JOB01" and "JOB02" are accumulated in MFP 100C, and the total process volume of the two jobs reaches 100 pages or more defined as the discount terms to cause the edge enhancement process to be executed in server 31C. In FIG. 8, the process identification information of the process now being executed is hatched.

The subsequent process apparatus in charge of the subsequent process of the jobs having the job identification information "JOB01" and "JOB02" is MFP 100. MFP 100C transmits the start notice signal to MFP 100 which is the subsequent process apparatus, at a stage when MFP 100C asks server 31C to execute an edge enhancement process. The start notice signal includes the job identification information "JOB01" and "JOB02."

Three jobs having the job identification information "JOB03," "JOB04," and "JOB05" are accumulated in MFP 100, and it is assumed that the total process volume of the three jobs reaches 10000 characters or more defined as the discount terms at a stage when the job having the job identification information "JOB05" is input. In this case, MFP 100, which has received the start notice signal from MFP 100C, waits without asking server 31 to execute a character recognition process, until the jobs having the job identification information "JOB01" and "JOB02" included in the start notice signal are received and stored into EEPROM 115.

Then, when the jobs having the job identification information "JOB01" and "JOB02" are received from MFP 100C and stored into EEPROM 115, MFP 100 asks server 31 to execute a character recognition process on the combination data in which five data included in the job identification information "JOB01," "JOB02," "JOB03," "JOB04," and "JOB05" are combined.

FIG. 9 shows a state of jobs at a stage when a request for a character recognition process is made to the server. Referring to FIG. 9, the process identification information of character recognition is hatched, indicating that all the jobs having the job identification information "JOB01," "JOB02," "JOB03," "JOB04," and "JOB05" are targets of a character recognition process.

Assume that a request to execute a character recognition process is made to server 31 immediately at a stage when the job having the job identification information "JOB05" is input and three jobs having the job identification information "JOB03," "JOB04," and "JOB05" are accumulated in MFP 100. Then, at a stage when the jobs having the job identification information "JOB01" and "JOB02" are accumulated in MFP 100 after an edge enhancement process is executed, the discount term "10000 characters or more" is not met. In this case, a character recognition process is not executed until a new job that includes a character recognition process is input to image processing system 1 next time. Therefore, it is possible to totally monitor the state of a plurality of jobs input to image processing system 1 and to execute a plurality of processes included in the jobs efficiently in image processing system 1. As a result, the job wait time may be shortened. Therefore, five jobs having the job identification information "JOB01," "JOB02," "JOB03," "JOB04," and "JOB05" can be processed efficiently.

The start notice signal is transmitted to MFP 100 in charge of the subsequent process when MFP 100C executing the previous process starts execution of the in-charge process, whereby MFP 100 can easily determine the existence of the jobs having the job identification information "JOB01" and "JOB02" which have the previous process now being executed.

<Second Embodiment>

In the first embodiment, in MFPs 100, 100A to 100D, when the in-charge process is executed, the start notice signal is transmitted to the subsequent process apparatus in charge of the subsequent process that follows the in-charge process. Even when the condition for MFP 100 to start execution of the in-charge process is met, if the start notice signal is received from any one of other MFPs 100A to 100D before a prescribed time T1 has elapsed, MFP 100 waits without executing the in-charge process until a job is received from the apparatus that has transmitted the start notice signal among other MFPs 100A to 100D.

In the second embodiment, in a similar manner as image processing system 1 in the first embodiment, even when the condition for MFP 100 to start execution of the in-charge process is met, if execution of a job that includes a process followed by the in-charge process of MFP 100 is started in any one of other MFPs 100A to 100D before a prescribed time T1 has elapsed, MFP 100 waits without executing the in-charge process until that job is received. Therefore, MFPs 100, 100A to 100D included in image processing system 1 in the second embodiment share information of a job at a moment when the job is input to image processing system 1, and when the condition for starting execution of the in-charge process is met, it is determined whether the previous process is started before a prescribed time T1 has elapsed. The differences from image processing system 1 in the first embodiment will be mainly described below.

FIG. 10 is a block diagram showing exemplary functions of a CPU of the MFP in a second embodiment and data stored in an EEPROM. The functions shown in FIG. 10 are implemented by CPU 111 of MFP 100 executing the job execution program stored in ROM 114, EEPROM 115, HDD 116, or CD-ROM 119A.

Referring to FIG. 10, the differences from the functions shown in FIG. 3 are that job accepting portion 51 and batch processing portion 55 are changed to a job accepting portion 51A and a batch processing portion 55A, respectively. In addition, start notice receiving portion 71 and start notice portion 79 included in batch processing portion 55 are deleted in batch processing portion 55A, and determination portion 73 included in batch processing portion 55 is changed to a determination portion 73A. The other functions are the same as the functions shown in FIG. 3 and therefore a description thereof will not be repeated here. The job execution process executed in MFPs 100, 100A to 100D is the same, and therefore MFP 100 will be taken as an example here, unless otherwise specified.

Job accepting portion 51A generates a job which includes the acquired data, the process identification information of each of the designated one or more processes, and the order of executing one or more processes. Job accepting portion 51A includes a prospective job information transmission portion 59. Prospective job information transmission portion 59 generates prospective job information which includes the job identification information for identifying the generated job, the process identification information of each of one or more processes included in the generated job, and the execution order of executing one or more processes. Prospective job information transmission portion 59 transmits the prospective job information to other MFPs 100A to 100D through communication I/F portion 112.

Figure 11:
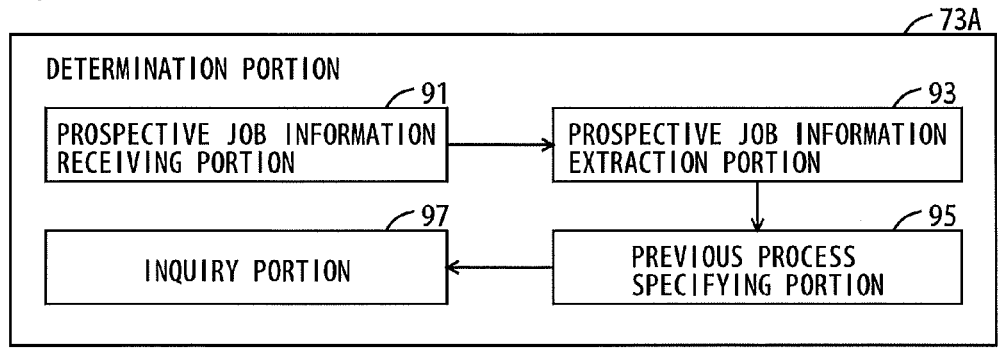
FIG. 11 is a block diagram showing exemplary functions of a determination portion in the second embodiment.

FIG. 11 is a block diagram showing exemplary functions of the determination portion in the second embodiment. Referring to FIG. 11, determination portion 73A includes a prospective job information receiving portion 91 receiving prospective job information, a prospective job information extraction portion 93 for extracting prospective job information, a previous process specifying process 95 for specifying a previous process that precedes the in-charge process, and an inquiry portion 97.

Prospective job information receiving portion 91 controls communication I/F portion 112 to receive the prospective job information from any one of other MFPs 100A to 100D.

Prospective job information receiving portion 91 outputs the received prospective job information to prospective job information extraction portion 93.

Prospective job information extraction portion 93 extracts the prospective job information that includes the process identification information of the in-charge process of MFP 100, from among the prospective job information input from prospective job information receiving portion 91. Then, prospective job information extraction portion 93 outputs all the extracted prospective information to previous process specifying portion 95.

Previous process specifying portion 95 specifies a previous process from each prospective job information input from prospective job information extraction portion 93. Previous process specifying portion 95 specifies, from the prospective job information, the process identification information that immediately precedes the process identification information of the in-charge process of MFP 100 in the execution order. Then, the specified process identification information is output to inquiry portion 97.

Inquiry portion 97 specifies a previous process apparatus in charge of the previous process of the process identification information that is input from previous process specifying portion 95, from among MFPs 100A to 100D, based on the process definition table stored in EEPROM 115. Then, in a period from when the condition-met signal is input from first delay portion 75 to when the first start instruction is input, an inquiry as to whether execution of the previous process is started is made to the specified previous process apparatus. As a result of the inquiry, a signal indicating now being executed or a signal indicating not being executed is returned from the previous process apparatus. The signal indicating now being executed includes the job identification information for identifying a job. The job identification information included in the signal indicating now being executed that is returned by the previous process apparatus is the job identification information for the subsequent process following the in-charge process of the previous process apparatus to identify the job of the in-charge process of MFP 100.

When the signal indicating now being executed is received from the previous process apparatus after the condition-met signal is input from first delay portion 75 and before the first start instruction is input, inquiry portion 97 determines that there exists a job that includes the in-charge process of MFP 100 and in which the previous process immediately before the in-charge process is now being executed. When the signal indicating now being executed is received from the previous process apparatus after the condition-met signal is input from first delay portion 75 and before the first start instruction is input, inquiry portion 97 outputs an existence signal to second delay portion 77. The existence signal includes the job identification information included in the signal indicating now being executed that is received from the previous process apparatus.

Figure 12:
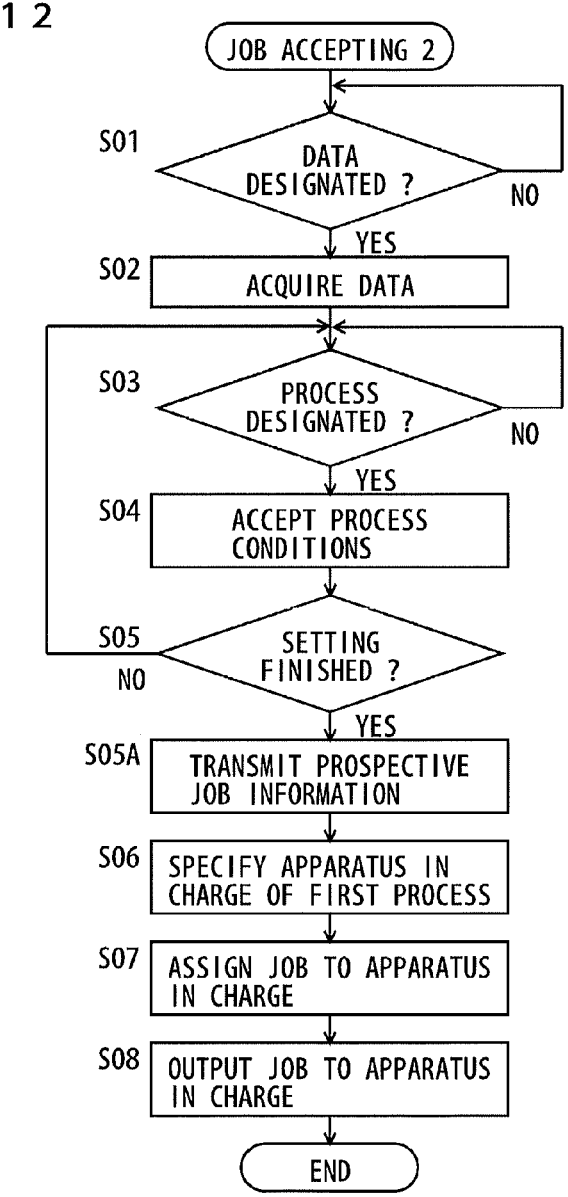
FIG. 12 is a flowchart showing an exemplary flow of a job accepting process in the second embodiment.

FIG. 12 is a flowchart showing an exemplary flow of a job accepting process in the second embodiment. Referring to FIG. 12, the difference from the job accepting process shown in FIG. 5 is that step S05A is added between step S05 and step S06. The other process is the same as the process shown in FIG. 5, and a description thereof will not be repeated here.

In step S05A, prospective job information is transmitted. The prospective job information is concerned with the job generated by execution of step S01 to step S04 and includes the job identification information for identifying the job, the process identification information of each of one or more processes included in the job, and the execution order of executing one or more processes. In step S05A, the prospective job information is transmitted to all other MFPs 100A to 100D through communication I/F portion 112.

FIG. 13 is a flowchart showing an exemplary flow of batch processing in the second embodiment. The batch processing is a process executed by CPU 111 when CPU 111 of MFP 100 executes the job execution program stored in ROM 114, EEPROM 115, HDD 116, or CD-ROM 119A. Referring to FIG. 13, CPU 111 determines whether prospective job information is received. It is determined whether communication I/F portion 112 receives prospective job information from any one of MFPs 100A to 100D. If prospective job information is received, the process proceeds to step S42. If not received, step S42 is skipped, and the process proceeds to step S43. In step S42, the received prospective job information is temporarily stored into EEPROM 115. The process then proceeds to step S43.

The process in step S43 to step S45 is the same as the process in step S21 to step S23 in FIG. 7. More specifically, the total process volume of the jobs accumulated in EEPROM 115 is calculated (step S43), and it is determined whether the calculated total process volume is equal to or greater than the lower limit value TA predetermined for the in-charge process (step S44). If the total process volume is equal to or greater than the lower limit value TA, the process proceeds to step S45. If not, the process returns to step S41. In other words, the batch processing allows a job to be stored into EEPROM 115 until the total process volume of the processes that server 31 is asked to execute reaches the lower limit value TA or more, and allows the prospective job information to be stored into EEPROM 115. In the next step S45, the timer is set to "0" and the process proceeds to step S46.

In step S46, the prospective job information that includes the process identification information of the in-charge process is extracted from the prospective job information stored in EEPROM 115. Then, the previous process is specified (step S47). In each of the extracted prospective job information, the process identification information that immediately precedes the process identification information of the in-charge process of MFP 100 in the execution order is specified as the previous process. Then, of MFPs 100A to 100D, the apparatus in charge of the previous process is specified as the previous process apparatus (step S48). If a plurality of prospective job information are extracted in step S46, a previous process apparatus is specified for each of the plurality of prospective job information.

In the next step S49, it is determined whether the timer value is equal to or smaller than the threshold value T1. If the timer value is equal to or smaller than the threshold value T1, the process proceeds to step S50. If not, the process proceeds to step S53. In the step S50, an inquiry as to whether the previous process is now being executed is made to the previous process apparatus. In a case where a plurality of previous process apparatuses are specified in step S48, the inquiry is made to all the plurality of previous process apparatuses. In the next step S51, it is determined whether the signal indicating now being executed is received from the previous process apparatus. If the signal indicating now being executed is received, the process proceeds to step S52. If not, the process returns to step S49. In the case where a plurality of previous process apparatuses are specified, if the signal indicating now being executed is received from at least one of the plurality of previous process apparatuses, the process proceeds to step S52.

In other words, step S52 is executed if the signal indicating now being executed is received from at least one of the plurality of previous process apparatuses before the time of the threshold value T1 has elapsed since the jobs 41 equivalent to the total process volume equal to or greater than the lower limit value TA are stored into EEPROM 115. Otherwise, step S52 is not executed.

In step S52, the process waits until a job is received from the previous process apparatus that has transmitted the signal indicating now being executed (NO in step S52). If a job is received (YES in step S52), the process proceeds to step S53. In step S53, the accumulated job is read out. Specifically, one of jobs 41 stored in EEPROM 115 is selected and read out. Then, the data included in the read-out job is added to the combination data (step S54). In the next step S55, it is determined whether there exists a job to be selected as a next process target among jobs 41 stored in EEPROM 115. If there exists a job that has not yet been read out in step S53, the process returns to step S53. If not, the process proceeds to step S56. The process in step S53 and step S34 is executed for all the jobs 41 stored in EEPROM 115.

The process in the next step S56 to step S59 is the same as the process in step S33 to step S36 shown in FIG. 7. Therefore, a description thereof will not be repeated here.

Here, using FIG. 8 and FIG. 9, the operation of MFPs 100, 100A to 100D and the transition of the job state in the second embodiment will be described. Referring to FIG. 8, a description will be given of a state of jobs at a stage immediately after the job having the job identification information "JOB05" is input, wherein five jobs are input to image processing system 1 in the order of the job identification information "JOB01," "JOB02," "JOB03," "JOB04," and "JOB05." In this case, prospective job information each including the job identification information "JOB01," "JOB02," "JOB03," "JOB04," and "JOB05" is input and stored in each of MFPs 100, 100A to 100D.

Here, it is assumed that the jobs having the job identification information "JOB01" and "JOB02" are accumulated in MFP 100C and that the total process volume of the two jobs reaches the discount term "100 pages or more" to cause an edge enhancement process to be executed in server 31C. In FIG. 8, the process identification information of the process now being executed is hatched.

It is also assumed that three jobs having the job identification information "JOB03," "JOB04," and "JOB05" are accumulated in MFP 100 and that the total process volume of the three jobs reaches the discount term "10000 characters or more" at a stage when the job having the job identification information "JOB05" is input. In this case, MFP 100 extracts the prospective job information that includes the in-charge process of MFP 100, based on the prospective job information. Here, five prospective job information that include the job identification information "JOB01," "JOB02," "JOB03," "JOB04," and "JOB05," respectively, are extracted. Then, the process identification information that immediately precedes the process identification information of the in-charge process of MFP 100 in the execution order is specified from each of the extracted five prospective job information. Specifically, the process identification information "edge enhancement" is specified as the previous process from each of two prospective job information that includes the job identification information "JOB01" and "JOB02." This is because a previous process does not exist in the three prospective job information that include job identification information "JOB03," "JOB04" and "JOB05," respectively.

Then, MFP 100C having the apparatus identification information "fourth MFP" in charge of the previous process having the process identification information "edge enhancement" is specified based on the process definition table shown in FIG. 4. An inquiry as to whether an edge enhancement process is now being executed is made to MFP 100C. MFP 100C, which is executing an edge enhancement process, returns the signal indicating now being executed. The signal indicating now being executed includes the job identification information "JOB01" and "JOB02." Therefore, MFP 100 waits without asking server 31 to execute a character recognition process until the jobs having the job identification information "JOB01" and "JOB02" included in the signal indicating now being executed are received and stored into EEPROM 115.

Then, when the jobs having the job identification information "JOB01" and "JOB02" are received from MFP 100C and stored into EEPROM 115, MFP 100 asks server 31 to execute a character recognition process on the combination data in which five data included in the job identification information "JOB01," "JOB02," "JOB03," "JOB04," and "JOB05," respectively, are combined.

FIG. 9 shows a state of jobs at a stage when a request for a character recognition process is made to the server. Referring to FIG. 9, the process identification information of character recognition is hatched, indicating that all the jobs having the job identification information "JOB01," "JOB02," "JOB03," "JOB04," and "JOB05" are targets of the character recognition process.

Assume that a request to execute a character recognition process is made to server 31 immediately at a stage when the job having the job identification information "JOB05" is input and three jobs having the job identification information "JOB03," "JOB04," and "JOB05" are accumulated in MFP 100. Then, the discount term "10000 characters or more" is not met at a stage when the jobs having the job identification information "JOB01" and "JOB02" are accumulated in MFP 100 after an edge enhancement process is executed. In this case, a character recognition process is not executed until a new job that includes a character recognition process is input to image processing system 1 next time. Therefore, it is possible to totally monitor the state of a plurality of jobs input to image processing system 1 and to execute a plurality of processes included in the jobs efficiently in image processing system 1. As a result, the job wait time may be shortened. Therefore, five jobs having the job identification information "JOB01," "JOB02," "JOB03," "JOB04," and "JOB05" can be processed efficiently.

MFP 100 in charge of the subsequent process specifies MFP 100C in charge of the previous process and asks MFP 100C as to the existence of job identification information "JOB01" and "JOB02" having the previous process now being executed. Therefore, the existence of the job identification information "JOB01" and "JOB02" having the previous process now being executed can be determined easily.

Although the present invention has been described and illustrated in detail, it is clearly understood that the same is by way of illustration and example only and is not to be taken by way of limitation, the spirit and scope of the present invention being limited only by the terms of the appended claims.

<Appendix>

According to an aspect of the present invention, an image processing system includes: a plurality of process execution portions, each being capable of executing an in-charge process selected from a plurality of processes; and a job accepting portion to accept a job which defines data serving as a process target, one or more processes selected from the plurality of processes for the data, and an order of executing the one or more processes. Each of the plurality of process execution portions includes an accumulation portion to accumulate a job that is accepted by the job accepting portion and in which a process in the first place in the order among processes not yet executed is the in-charge process, and a batch processing portion to, on condition that a total process volume for executing one or more jobs accumulated by the accumulation portion becomes equal to or greater than a lower limit value predetermined for the in-charge process, execute the in-charge process on combination data in which one or more data that are process targets of the accumulated one or more jobs are combined into one. The batch processing portion includes a determination portion to determine whether there exists a job that includes the in-charge process and in which a previous process immediately before the in-charge process is now being executed, among a plurality of jobs accepted by the job accepting portion, a first delay portion to delay start of the in-charge process until a prescribed time has elapsed since a start-enabled time at which the total process volume becomes equal to or greater than the lower limit value, and a second delay portion to delay start of the in-charge process until a job determined that the previous process is now being executed is accumulated in the accumulation portion, if it is determined by the determination portion that there exists a job in which the previous process is now being executed, before the prescribed time has elapsed since the start-enabled time.

According to this aspect, the start of the in-charge process is delayed until a prescribed time has elapsed from the start-enabled time at which the total process volumes becomes equal to or greater than the lower limit value. In addition, if it is determined that there exists a job that includes the in-charge process and in which a previous process immediately before the in-charge process is now being executed, among a plurality of jobs, before a prescribed time has elapsed since the start-enabled time, the start of the in-charge process is delayed until the job determined that the previous process is being executed is accumulated. Therefore, the wait time may be shortened for the job having the previous process now being executed at the time when the total process volume reaches the lower limit value or more. As a result, it is possible to provide an image processing system capable of efficiently processing a plurality of jobs.

Preferably, the batch processing portion further includes a start notice portion to, in response to execution of the in-charge process being started, specify a subsequent process immediately after the in-charge process in each of the one or more jobs that are targets of the in-charge process, and to output a start notice signal to indicate the start to a subsequent process execution portion in charge of the subsequent process among the plurality of process execution portions. The determination portion determines that there exists a job in which a previous process is now being executed, if a start signal is input from any one of the plurality of process execution portions before the prescribed time has elapsed since the start-enabled time.

According to this aspect, it is determined that there exists a job having the previous process being executed, if a start signal transmitted to the subsequent process execution portion is input before a prescribed time has elapsed since the start-enabled time. Therefore, the existence of a job having the previous process now being executed can be determined easily.

Preferably, the job accepting portion includes a prospective job information notice portion to, in response to the job being accepted, notify all of the plurality of process execution portions of prospective job information which includes one or more processes selected from the plurality of processes defined by the accepted job and an order of executing the one or more processes. The determination portion includes a prospective job information extraction portion to extract prospective job information in which the in-charge process has not yet been executed, from among one or more prospective job information provided from the prospective job information notice portion, and a previous process specifying portion to specify a previous process immediately before the in-charge process, in the extracted prospective job information. It is determined whether a job specified by the extracted prospective job information is now being executed in a previous process execution portion in charge of the specified previous process among the plurality of process execution portions.

According to this aspect, it is determined that there exists a job having the previous process now being executed, if a job is now being executed in a previous process execution portion in charge of a previous process immediately before the in-charge process, in prospective job information in which the process-in charge has not been executed, among prospective job information. Therefore, the existence of a job having the previous process now being executed can be determined easily.

Preferably, the image processing system includes a plurality of image processing apparatuses. Each of the plurality of process execution portions is provided in any one of the plurality of image processing apparatuses, and the job accepting portion is provided in one or more of the plurality of image processing apparatuses.

Preferably, each of the plurality of process execution portions includes a request portion to request execution of the in-charge process by transmitting data serving as a process target to a server apparatus registered in advance as a destination that executes the in-charge process, and a data receiving portion to receive data as a process result from the server apparatus requested to execute the in-charge process.

According to this aspect, it is possible to allow a server apparatus registered in advance to execute a process.

According to another aspect of the present invention, a job execution method is executed in an image processing system including a plurality of process execution portions each being capable of executing an in-charge process selected from a plurality of processes. The method allows each of the plurality of process execution portions to execute: an accumulation step of accumulating a job which defines data serving as a process target, one or more processes selected from the plurality of processes for the data, and an order of executing the one or more processes, and in which a process in the first place in the order among processes not yet executed is the in-charge process; and a batch processing step of, on condition that a total process volume for executing one or more jobs accumulated in the accumulation step becomes equal to or greater than a lower limit value predetermined for the in-charge process, executing the in-charge process on combination data in which one or more data that are process targets of the accumulated one or more jobs are combined into one. The batch processing step includes a determination step of determining whether there exists a job that is not accumulated in the accumulation step and in which a previous process immediately before the in-charge process is now being executed, a first delay step of delaying start of the in-charge process until a prescribed time has elapsed since a start-enabled time at which the total process volume becomes equal to or greater than the lower limit value, and a second delay step of delaying start of the in-charge process until a job determined that the previous process is now being executed is accumulated in the accumulation step, if it is determined in the determination step that there exists a job in which the previous process is now being executed, before the prescribed time has elapsed since the start-enabled time.

According to this aspect, it is possible to provide a job execution method capable of efficiently processing a plurality of jobs.

Preferably, the batch processing step further includes a step of, in response to execution of the in-charge process being started, specifying a subsequent process immediately after the in-charge process in each of the one or more jobs that are targets of the in-charge process, and a step of outputting a start notice signal to indicate the start to a subsequent process execution portion in charge of the subsequent process among the plurality of process execution portions. The determination step includes a step of determining that there exists a job in which a previous process is now being executed, if a start signal is input from any one of the plurality of process execution portions before the prescribed time has elapsed since the start-enabled time.

Preferably, the method allows each of the plurality of process execution portions to further execute a prospective job information receiving step of, at a moment when a job is input to the image processing system, receiving prospective job information which includes one or more processes selected from the plurality of processes defined by the input job and an order of executing the one or more processes. The determination step includes a prospective job information extraction step of extracting prospective job information in which the in-charge process has not yet been executed, from among one or more prospective job information received in the prospective job information receiving step, a previous process specifying step of specifying a previous process immediately before the in-charge process, in the extracted prospective job information, and a step of determining whether a job specified by the extracted prospective job information is now being executed in a previous process execution portion in charge of the specified previous process among the plurality of process execution portions.

In accordance with a further aspect of the present invention, a non-transitory computer-readable recording medium is encoded with a job execution program performed by a computer. The program is executed in an image processing system including a plurality of process execution apparatuses, each being capable of executing an in-charge process selected from a plurality of processes. The program causes the computer controlling each of the plurality of process execution apparatuses to execute: an accumulation step of accumulating a job which defines data serving as a process target, one or more processes selected from the plurality of processes for the data, and an order of executing the one or more processes, and in which a process in the first place in the order among processes not yet executed is the in-charge process; and a batch processing step of, on condition that a total process volume for executing one or more jobs accumulated in the accumulation step becomes equal to or greater than a lower limit value predetermined for the in-charge process, executing the in-charge process on combination data in which one or more data that are process targets of the accumulated one or more jobs are combined into one. The batch process step includes a determination step of determining whether there exists a job that is not accumulated in the accumulation step and in which a previous process immediately before the in-charge process is now being executed, a first delay step of delaying start of the in-charge process until a prescribed time has elapsed since a start-enabled time at which the total process volume becomes equal to or greater than the lower limit value, and a second delay step of delaying start of the in-charge process until a job determined that the previous process is now being executed is accumulated in the accumulation step, if it is determined in the determination step that there exists a job in which the previous process is now being executed, before the prescribed time has elapsed since the start-enabled time.

According to this aspect, it is possible to provide a job execution program capable of efficiently processing a plurality of jobs.

Preferably, the batch processing step further includes a step of, in response to execution of the in-charge process being started, specifying a subsequent process immediately after the in-charge process in each of the one or more jobs that are targets of the in-charge process, and a step of outputting a start notice signal to indicate the start to a subsequent process execution apparatus in charge of the subsequent process among the plurality of process execution apparatuses. The determination step includes a step of determining that there exists a job in which a previous process is now being executed, if a start signal is input from any one of the plurality of process execution apparatuses before the prescribed time has elapsed since the start-enabled time.

Preferably, the program causes the computer controlling each of the plurality of process execution apparatuses to further execute a prospective job information receiving step of, at a moment when a job is input to the image processing system, receiving prospective job information which includes one or more processes selected from the plurality of processes defined by the input job and an order of executing the one or more processes. The determination step includes a prospective job information extraction step of extracting prospective job information in which the in-charge process has not yet been executed, from among one or more prospective job information received in the prospective job information receiving step, a previous process specifying step of specifying a previous process immediately before the in-charge process, in the extracted prospective job information, and a step of determining whether a job specified by the extracted prospective job information is now being executed in a previous process execution apparatus in charge of the specified previous process among the plurality of process execution apparatuses.

What is claimed is:

1. An image processing system comprising:
a plurality of process execution portions, each being capable of executing an in-charge process selected from a plurality of processes; and
a job accepting portion to accept a job which defines data serving as a process target, one or more processes selected from said plurality of processes for said data, and an order of executing said one or more processes,
each of said plurality of process execution portions including
an accumulation portion to accumulate a job that is accepted by said job accepting portion and in which a process in a first place in the order among processes not yet executed is said in-charge process, and
a batch processing portion to, on condition that a total process volume for executing one or more jobs accumulated by said accumulation portion becomes equal to or greater than a lower limit value predetermined for said in-charge process, execute said in-charge process on combination data in which one or more data that are process targets of said accumulated one or more jobs are combined into one,
said batch processing portion including
a determination portion to determine whether there exists a job that includes said in-charge process and in which a previous process immediately before said in-charge process is now being executed, among a plurality of jobs accepted by said job accepting portion, a first delay portion to delay start of said in-charge process until a prescribed time has elapsed since a start-enabled time at which said total process volume becomes equal to or greater than said lower limit value, and a second delay portion to delay start of said in-charge process until a job determined that said previous process is now being executed is accumulated in said accumulation portion, if it is determined by said determination portion that there exists a job in which said previous process is now being executed, before said prescribed time has elapsed since said start-enabled time.

2. The image processing system according to claim 1, wherein said batch processing portion further includes a start notice portion to, in response to execution of said in-charge process being started, specify a subsequent process immediately after said in-charge process in each of said one or more jobs that are targets of said in-charge process, and output a start notice signal to indicate a start to a subsequent process execution portion in charge of said subsequent process among said plurality of process execution portions, and said determination portion determines that there exists a job in which a previous process is now being executed, if a start signal is input from any one of said plurality of process execution portions before said prescribed time has elapsed since said start-enabled time.

3. The image processing system according to claim 1, wherein said job accepting portion includes a prospective job information notice portion to, in response to said job being accepted, notify all of said plurality of process execution portions of prospective job information which includes one or more processes selected from said plurality of processes defined by said accepted job and an order of executing said one or more processes, said determination portion includes
a prospective job information extraction portion to extract prospective job information in which said in-charge process has not yet been executed, from among one or more prospective job information provided from said prospective job information notice portion, and
a previous process specifying portion to specify a previous process immediately before said in-charge process, in said extracted prospective job information, and it is determined whether a job specified by said extracted prospective job information is now being executed in a previous process execution portion in charge of said specified previous process among said plurality of process execution portions.

4. The image processing system according to claim 1, comprising a plurality of image processing apparatuses, wherein each of said plurality of process execution portions is provided in any one of said plurality of image processing apparatuses, and said job accepting portion is provided in one or more of said plurality of image processing apparatuses.

5. The image processing system according to claim 1, wherein each of said plurality of process execution portions includes a request portion to request execution of said in-charge process by transmitting data serving as a process target to a server apparatus registered in advance as a destination that executes said in-charge process, and a data receiving portion to receive data as a process result from said server apparatus requested to execute said in-charge process.

6. A job execution method executed in an image processing system including a plurality of process execution portions each being capable of executing an in-charge process selected from a plurality of processes, said job execution method allowing each of said plurality of process execution portions to execute:

an accumulation step of accumulating a job which defines data serving as a process target, one or more processes selected from said plurality of processes for said data, and an order of executing said one or more processes, and in which a process in a first place in the order among processes not yet executed is said in-charge process; and a batch processing step of, on condition that a total process volume for executing one or more jobs accumulated in said accumulation step becomes equal to or greater than a lower limit value predetermined for said in-charge process, executing said in-charge process on combination data in which one or more data that are process targets of said accumulated one or more jobs are combined into one, said batch processing step including
a determination step of determining whether there exists a job that is not accumulated in said accumulation step and in which a previous process immediately before said in-charge process is now being executed,
a first delay step of delaying start of said in-charge process until a prescribed time has elapsed since a start-enabled time at which said total process volume becomes equal to or greater than said lower limit value, and
a second delay step of delaying start of said in-charge process until a job determined that said previous process is now being executed is accumulated in said accumulation step, if it is determined in said determination step that there exists a job in which said previous process is now being executed, before said prescribed time has elapsed since said start-enabled time.

7. The job execution method according to claim 6, wherein said batch processing step further includes a step of, in response to execution of said in-charge process being started, specifying a subsequent process immediately after said in-charge process in each of said one or more jobs that are targets of said in-charge process, and a step of outputting a start notice signal to indicate a start to a subsequent process execution portion in charge of said subsequent process among said plurality of process execution portions, and said determination step includes a step of determining that there exists a job in which a previous process is now being executed, if a start signal is input from any one of said plurality of process execution portions before said prescribed time has elapsed since said start-enabled time.

8. The job execution method according to claim 6, wherein said method allows each of said plurality of process execution portions to further execute a prospective job information receiving step of, at a moment when a job is input to said image processing system, receiving prospective job information which includes one or more processes selected from said plurality of processes defined by said input job and an order of executing said one or more processes, said determination step includes
- a prospective job information extraction step of extracting prospective job information in which said in-charge process has not yet been executed, from among one or more prospective job information received in said prospective job information receiving step,
- a previous process specifying step of specifying a previous process immediately before said in-charge process, in said extracted prospective job information, and
- a step of determining whether a job specified by said extracted prospective job information is now being executed in a previous process execution portion in charge of said specified previous process among said plurality of process execution portions.

9. A non-transitory computer-readable recording medium encoded with a job execution program performed by a computer, said job execution program being executed in an image processing system including a plurality of process execution apparatuses, each being capable of executing an in-charge process selected from a plurality of processes, said program causing said computer controlling each of said plurality of process execution apparatuses to execute:
- an accumulation step of accumulating a job which defines data serving as a process target, one or more processes selected from said plurality of processes for said data, and an order of executing said one or more processes, and in which a process in a first place in the order among processes not yet executed is said in-charge process; and
- a batch processing step of, on condition that a total process volume for executing one or more jobs accumulated in said accumulation step becomes equal to or greater than a lower limit value predetermined for said in-charge process, executing said in-charge process on combination data in which one or more data that are process targets of said accumulated one or more jobs are combined into one, said batch process step including
- a determination step of determining whether there exists a job that is not accumulated in said accumulation step and in which a previous process immediately before said in-charge process is now being executed,
- a first delay step of delaying start of said in-charge process until a prescribed time has elapsed since a start-enabled time at which said total process volume becomes equal to or greater than said lower limit value, and
- a second delay step of delaying start of said in-charge process until a job determined that said previous process is now being executed is accumulated in said accumulation step, if it is determined in said determination step that there exists a job in which said previous process is now being executed, before said prescribed time has elapsed since said start-enabled time.

10. The non-transitory computer-readable recording medium according to claim 9, wherein
said batch processing step further includes
- a step of, in response to execution of said in-charge process being started, specifying a subsequent process immediately after said in-charge process in each of said one or more jobs that are targets of said in-charge process, and
- a step of outputting a start notice signal to indicate a start to a subsequent process execution apparatus in charge of said subsequent process among said plurality of process execution apparatuses, and said determination step includes a step of determining that there exists a job in which a previous process is now being executed, if a start signal is input from any one of said plurality of process execution apparatuses before said prescribed time has elapsed since said start-enabled time.

11. The non-transitory computer-readable recording medium according to claim 9, wherein
said program causes said computer controlling each of said plurality of process execution apparatuses to further execute a prospective job information receiving step of, at a moment when a job is input to said image processing system, receiving prospective job information which includes one or more processes selected from said plurality of processes defined by said input job and an order of executing said one or more processes, said determination step includes
- a prospective job information extraction step of extracting prospective job information in which said in-charge process has not yet been executed, from among one or more prospective job information received in said prospective job information receiving step,
- a previous process specifying step of specifying a previous process immediately before said in-charge process, in said extracted prospective job information, and
- a step of determining whether a job specified by said extracted prospective job information is now being executed in a previous process execution apparatus in charge of said specified previous process among said plurality of process execution apparatuses.

* * * * *